United States Patent
He et al.

(10) Patent No.: US 8,561,155 B2
(45) Date of Patent: Oct. 15, 2013

(54) SYSTEMS AND METHODS FOR USING A CLIENT AGENT TO MANAGE HTTP AUTHENTICATION COOKIES

(75) Inventors: Junxiao He, Saratoga, CA (US); Charu Venkatraman, Bangalore (IN); Ajay Soni, San Jose, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1005 days.

(21) Appl. No.: 11/462,300

(22) Filed: Aug. 3, 2006

(65) Prior Publication Data

US 2008/0034198 A1 Feb. 7, 2008

(51) Int. Cl.
*H04L 29/06* (2006.01)
(52) U.S. Cl.
USPC ............ 726/5; 726/2; 726/3; 726/9; 713/150; 713/151; 713/152; 713/153; 713/168
(58) Field of Classification Search
USPC ....................... 713/150–153, 168; 726/2, 3, 5
See application file for complete search history.

(56) References Cited

U.S. PATENT DOCUMENTS

| | | |
|---|---|---|
| 5,867,494 A | 2/1999 | Krishnaswamy et al. |
| 5,909,559 A | 6/1999 | So |
| 5,999,525 A | 12/1999 | Krishnaswamy et al. |
| 6,011,537 A | 1/2000 | Slotznick |
| 6,085,224 A | 7/2000 | Wagner |
| 6,141,699 A | 10/2000 | Luzzi et al. |
| 6,161,139 A | 12/2000 | Win et al. |
| 6,167,441 A | 12/2000 | Himmel |
| 6,182,139 B1 * | 1/2001 | Brendel .................. 709/226 |
| 6,182,142 B1 | 1/2001 | Win et al. |
| 6,185,625 B1 | 2/2001 | Tso et al. |

(Continued)

FOREIGN PATENT DOCUMENTS

| | | |
|---|---|---|
| CN | 1478348 | 2/2004 |
| WO | WO-99/64967 A1 | 12/1999 |

(Continued)

OTHER PUBLICATIONS

Final Office Action for U.S. Appl. No. 11/462,267 dated Nov. 10, 2010.

(Continued)

*Primary Examiner* — Yin-Chen Shaw
(74) *Attorney, Agent, or Firm* — Foley & Lardner LLP; Christopher J. McKenna

(57) ABSTRACT

Systems and methods are described for using a client agent to manage HTTP authentication cookies. One method includes intercepting, by a client agent executing on a client, a connection request from the client; establishing, by the client agent, a transport layer virtual private network connection with a network appliance; transmitting, by the client agent via the established connection, an HTTP request comprising an authentication cookie; and transmitting, by the client agent via the connection, the connection request. A second method includes intercepting, by a client agent executing on a client, an HTTP communication comprising a cookie from an appliance on a virtual private network to the client; removing, by the client agent, the cookie from the HTTP communication; storing, by the client agent, the received cookie; transmitting, by the client agent, the modified HTTP communication to an application executing on the client; intercepting, by the client agent, an HTTP request from the client; inserting, by the client agent in the HTTP request, the received cookie; and transmitting the modified HTTP request to the appliance. Corresponding systems are also described.

17 Claims, 15 Drawing Sheets

(56) References Cited

U.S. PATENT DOCUMENTS

| | | | |
|---|---|---|---|
| 6,321,235 B1 | 11/2001 | Bird et al. | |
| 6,335,927 B1 | 1/2002 | Elliott et al. | |
| 6,449,658 B1* | 9/2002 | Lafe et al. | 709/247 |
| 6,578,073 B1 | 6/2003 | Starnes et al. | |
| 6,584,567 B1* | 6/2003 | Bellwood et al. | 713/171 |
| 6,584,569 B2 | 6/2003 | Reshef et al. | |
| 6,625,643 B1 | 9/2003 | Colby et al. | |
| 6,640,240 B1 | 10/2003 | Hoffman et al. | |
| 6,680,922 B1 | 1/2004 | Jorgensen | |
| 6,731,625 B1 | 5/2004 | Eastep et al. | |
| 6,754,181 B1 | 6/2004 | Elliott et al. | |
| 6,771,290 B1 | 8/2004 | Hoyle | |
| 6,772,203 B1 | 8/2004 | Feiertag et al. | |
| 6,823,374 B2 | 11/2004 | Kausik et al. | |
| 6,826,594 B1 | 11/2004 | Pettersen | |
| 6,826,696 B1 | 11/2004 | Chawla et al. | |
| 6,909,708 B1 | 6/2005 | Krishnaswamy et al. | |
| 6,980,962 B1 | 12/2005 | Arganbright et al. | |
| 6,987,987 B1 | 1/2006 | Vacanti et al. | |
| 7,034,691 B1 | 4/2006 | Rapaport et al. | |
| 7,035,907 B1 | 4/2006 | Decasper et al. | |
| 7,058,718 B2* | 6/2006 | Fontes et al. | 709/228 |
| 7,080,158 B1* | 7/2006 | Squire | 709/245 |
| 7,085,834 B2 | 8/2006 | Delany et al. | |
| 7,092,370 B2 | 8/2006 | Jiang et al. | |
| 7,093,018 B1 | 8/2006 | Sievers et al. | |
| 7,096,495 B1* | 8/2006 | Warrier et al. | 726/15 |
| 7,107,309 B1 | 9/2006 | Geddes et al. | |
| 7,117,504 B2 | 10/2006 | Smith et al. | |
| 7,127,713 B2 | 10/2006 | Davis et al. | |
| 7,145,898 B1 | 12/2006 | Elliott | |
| 7,203,722 B2 | 4/2007 | Elnozahy | |
| 7,209,466 B2 | 4/2007 | Cabana | |
| 7,216,173 B2 | 5/2007 | Clayton et al. | |
| 7,373,462 B2* | 5/2008 | Blumrich et al. | 711/146 |
| 7,389,540 B2 | 6/2008 | Radatti et al. | |
| 7,441,119 B2* | 10/2008 | Brabson et al. | 713/164 |
| 7,464,332 B2 | 12/2008 | Carter, II | |
| 7,512,702 B1 | 3/2009 | Srivastava et al. | |
| 7,565,450 B2 | 7/2009 | Garcia-Luna-Aceves et al. | 709/245 |
| 7,571,464 B2* | 8/2009 | Watkins | 726/3 |
| 7,616,597 B2 | 11/2009 | Liu et al. | 370/328 |
| 2002/0010855 A1 | 1/2002 | Reshef et al. | |
| 2002/0065911 A1 | 5/2002 | Von Klopp et al. | |
| 2002/0083175 A1 | 6/2002 | Afek et al. | |
| 2002/0116642 A1 | 8/2002 | Joshi et al. | |
| 2002/0129271 A1* | 9/2002 | Stanaway et al. | 713/201 |
| 2002/0133723 A1* | 9/2002 | Tait | 713/201 |
| 2002/0138572 A1 | 9/2002 | Delany et al. | |
| 2002/0143798 A1 | 10/2002 | Lisiecki et al. | |
| 2002/0143888 A1 | 10/2002 | Lisiecki et al. | |
| 2002/0147774 A1 | 10/2002 | Lisiecki et al. | |
| 2002/0147927 A1 | 10/2002 | Tait | |
| 2002/0161904 A1* | 10/2002 | Tredoux et al. | 709/229 |
| 2002/0165971 A1 | 11/2002 | Baron | |
| 2002/0178211 A1 | 11/2002 | Singhai et al. | |
| 2003/0037108 A1 | 2/2003 | Peiffer et al. | |
| 2003/0051142 A1 | 3/2003 | Hidalgo et al. | |
| 2003/0105957 A1 | 6/2003 | Brabson et al. | |
| 2003/0154239 A1 | 8/2003 | Davis et al. | |
| 2003/0182423 A1 | 9/2003 | Shafir et al. | |
| 2003/0217149 A1* | 11/2003 | Crichton et al. | 709/225 |
| 2003/0233581 A1 | 12/2003 | Reshef et al. | |
| 2004/0031058 A1 | 2/2004 | Reisman | |
| 2004/0039827 A1 | 2/2004 | Thomas et al. | |
| 2004/0122951 A1 | 6/2004 | Beck et al. | |
| 2004/0177247 A1 | 9/2004 | Peles | |
| 2005/0015429 A1* | 1/2005 | Ashley et al. | 709/200 |
| 2005/0039190 A1 | 2/2005 | Rees et al. | |
| 2005/0055577 A1* | 3/2005 | Wesemann et al. | 713/201 |
| 2005/0108517 A1* | 5/2005 | Dillon et al. | 713/150 |
| 2005/0122980 A1 | 6/2005 | Anand et al. | |
| 2005/0132030 A1* | 6/2005 | Hopen et al. | 709/223 |
| 2005/0198380 A1 | 9/2005 | Panasyuk et al. | 709/239 |
| 2005/0251856 A1 | 11/2005 | Araujo et al. | 726/12 |
| 2005/0273849 A1* | 12/2005 | Araujo et al. | 726/12 |
| 2005/0273850 A1 | 12/2005 | Freund | |
| 2006/0041635 A1 | 2/2006 | Alexander et al. | |
| 2006/0047974 A1 | 3/2006 | Alpern et al. | |
| 2006/0068755 A1 | 3/2006 | Shraim et al. | |
| 2006/0080432 A1 | 4/2006 | Spataro et al. | 709/224 |
| 2006/0112174 A1 | 5/2006 | L'Heureux et al. | |
| 2006/0245414 A1* | 11/2006 | Susai et al. | 370/352 |
| 2007/0005777 A1 | 1/2007 | Fremantle et al. | |
| 2007/0156852 A1 | 7/2007 | Sundarrajan et al. | |
| 2007/0179955 A1 | 8/2007 | Croft et al. | |
| 2007/0180088 A1* | 8/2007 | Zhao | 709/223 |
| 2007/0192853 A1 | 8/2007 | Shraim et al. | |
| 2007/0245409 A1 | 10/2007 | Harris et al. | |
| 2007/0294762 A1 | 12/2007 | Shraim et al. | |
| 2007/0299915 A1 | 12/2007 | Shraim et al. | |
| 2008/0016233 A1 | 1/2008 | Schneider | |
| 2008/0034416 A1 | 2/2008 | Kumar et al. | |
| 2008/0034425 A1 | 2/2008 | Overcash et al. | |
| 2008/0046616 A1 | 2/2008 | Verzunov et al. | |
| 2008/0049786 A1 | 2/2008 | Ram et al. | |
| 2008/0225720 A1 | 9/2008 | Khemani et al. | |
| 2008/0225748 A1 | 9/2008 | Khemani et al. | |
| 2008/0225753 A1 | 9/2008 | Khemani et al. | |
| 2008/0229381 A1 | 9/2008 | Sikka et al. | |
| 2010/0125898 A1* | 5/2010 | Dubuc et al. | 726/7 |

FOREIGN PATENT DOCUMENTS

| | | |
|---|---|---|
| WO | WO-0051031 | 8/2000 |
| WO | WO-0245370 | 6/2002 |
| WO | WO-2006012612 | 2/2006 |
| WO | WO-2006074072 | 7/2006 |
| WO | WO-2007/065146 A2 | 6/2007 |
| WO | WO-2008/112692 A2 | 9/2008 |

OTHER PUBLICATIONS

Final Office Action for U.S. Appl. No. 11/462,308 dated Feb. 24, 2010.
International Search Report, PCT/US2007/075178, mailed on Jan. 28, 2008.
Non-final Office Action for U.S. Appl. No. 11/462,267 dated May 27, 2010.
Non-final Office Action for U.S. Appl. No. 11/462,308 dated Aug. 4, 2009.
Non-final Office Action for U.S. Appl. No. 11/462,308 dated Nov. 12, 2010.
Rob Barrett, Paul P. Maglio, "Intermediaries: New Places for Producing and Manipulating Web Content", 1998.
Written Opinion of the International Searching Authority, PCT/US2007/075037, mailed on Oct. 1, 2008.
Non-Final Office Action issued in U.S. Appl. No. 11/462,308 dated Nov. 12, 2010.
Notice of Allowance on U.S. Appl. No. 11/462,308 dated Nov. 23, 2012.
Australian Examination Report on 2007281083 dated Nov. 30, 2010.
Chinese Office Action on 200780036904.8 dated Apr. 12, 2012.
Chinese Office Action on 200780036904.8 dated Oct. 10, 2011.
International Preliminary Report on Patentability, PCT/US2007/075037, mailed on Feb. 3, 2009.
Office Action on U.S. Appl. No. 11/462,267 dated May 11, 2011.
Office Action on U.S. Appl. No. 11/462,308 dated May 10, 2011.
Written Opinion of the International Searching Authority, PCT/US2007/075178, mailed on Jan. 28, 2008.

* cited by examiner

SYSTEMS AND METHODS FOR USING A CLIENT AGENT TO MANAGE HTTP AUTHENTICATION COOKIES

FIELD OF THE INVENTION

The present invention relates to networking technologies, and specifically the use of a client agent to intercept HTTP requests and responses and manage cookies in order to provide optimized communications.

BACKGROUND OF THE INVENTION

Many applications, such as web browsers, communicate with servers using HTTP. This may result in a significant amount of traffic over a given network being HTTP traffic. Thus, many benefits may be obtained by optimizing and controlling the flow of HTTP traffic in a virtual private network. For example, caching may be used to improve service for repeated HTTP requests. Or, for example, benefits may be obtained by controlling the names of resources requested, and any data sent along with a request. However, the number of different applications using HTTP may make impractical the task of adapting all HTTP applications specifically for operating in a virtual private network environment.

Many virtual private networks and resources within them also require user authentication. For example, a user of a virtual private network may be asked to provide a name and password in order to log on to the network, and also to gain access to certain resources. HTTP cookies may be used to pass authentication information from a client to a virtual private network appliance. Often web browsers are used to manage these authentication cookies.

Several problems may arise in the use of web browsers to manage HTTP cookies to authenticate users of a virtual private network. For example, a user may use a web browser to open a plurality of simultaneous connections to a virtual private network. It may be desirable in this case that the authentication cookie from the first connection be used again to establish the second connection so the user does not have to reenter the authentication information. This feature may be difficult to implement given the variety of cookie management policies across different browsers, such as expiration time, and accessibility of the cookie cache. Also, for example, a user may attempt to open a non-HTTP connection via the virtual private network, in which case the web browser may not be used, meaning the authentication cookie may not be accessible.

Thus there exists a need for a client agent which can intercept and parse HTTP communications and manage cookies in a virtual private network environment.

BRIEF SUMMARY OF THE INVENTION

The present invention relates to systems and methods for using an HTTP-aware client agent. In one aspect, the present invention is a method for using a client agent operating in a virtual private network environment to intercept HTTP communications. In one embodiment, the method comprises: intercepting at the network layer, by a client agent executing on a client, an HTTP request from an application executing on the client; modifying the HTTP request; and transmitting, via a transport layer connection, the modified HTTP request to a server. In some embodiments, the method may comprise adding, removing, or modifying at least one cookie in the HTTP request. In other embodiments, the method may comprise modifying at least one name-value pair contained in the HTTP request.

In a second aspect, the present invention relates to a computer implemented system for using a client agent operating in a virtual private network environment to intercept HTTP communications. In one embodiment, the system comprises: a client computing device; and a client agent which executes on the client; intercepts at the network layer an HTTP request from an application executing on the client; modifies the HTTP request; and transmits, via a transport layer connection, the modified HTTP request to a server.

In third aspect, the present invention is a method for using a client agent to enable HTTP cookie authentication in non-HTTP communications from a client, the method comprising: intercepting, by a client agent executing on a client, a connection request from the client; establishing, by the client agent, a transport layer virtual private network connection with a network appliance; transmitting, by the client agent via the established connection, an HTTP request comprising an authentication cookie; and transmitting, by the client agent via the connection, the connection request.

In a fourth aspect the present invention is a computer implemented system for using a client agent to enable HTTP cookie authentication in non-HTTP communications from a client, the system comprising: a client computing device; and a client agent executing on the client, which intercepts a connection request from the client; establishes a transport layer virtual private network connection with a network appliance; transmits, by the client agent via the established connection, an HTTP request comprising an authentication cookie; and transmits, by the client agent via the connection, the connection request.

In a fifth aspect, the present invention is a method for using a client agent to enable secure authentication in a virtual private network environment using an HTTP cookie, the method comprising: intercepting, by a client agent executing on a client, an HTTP communication comprising a cookie from an appliance on a virtual private network to the client; removing, by the client agent, the cookie from the HTTP communication; storing, by the client agent, the received cookie; transmitting, by the client agent, the modified HTTP communication to an application executing on the client; intercepting, by the client agent, an HTTP request from the client; inserting, by the client agent in the HTTP request, the received cookie; and transmitting the modified HTTP request to the appliance.

In a sixth aspect, the present invention is a computer implemented system for using a client agent to enable secure authentication in a virtual private network environment using an HTTP cookie, the system comprising: a client computing device; and a client agent executing on the client which intercepts an HTTP communication comprising a cookie from an appliance on a virtual private network to the client; removes the cookie from the HTTP communication; stores the received cookie; transmits the modified HTTP communication to an application executing on the client; intercepts, by the client agent, an HTTP request from the client; inserting, by the client agent in the HTTP request, the received cookie; and transmitting the modified HTTP request to the appliance.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
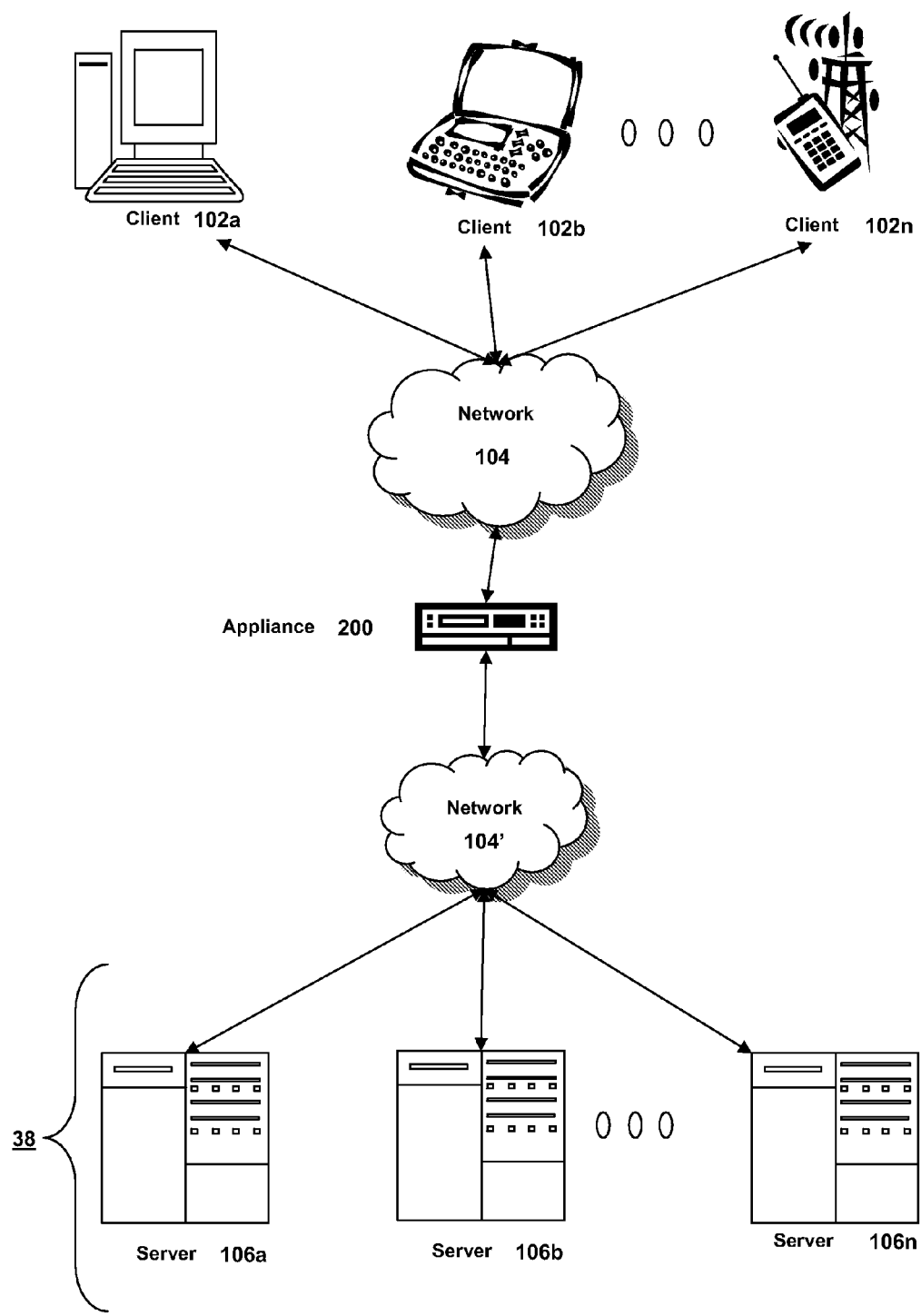
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
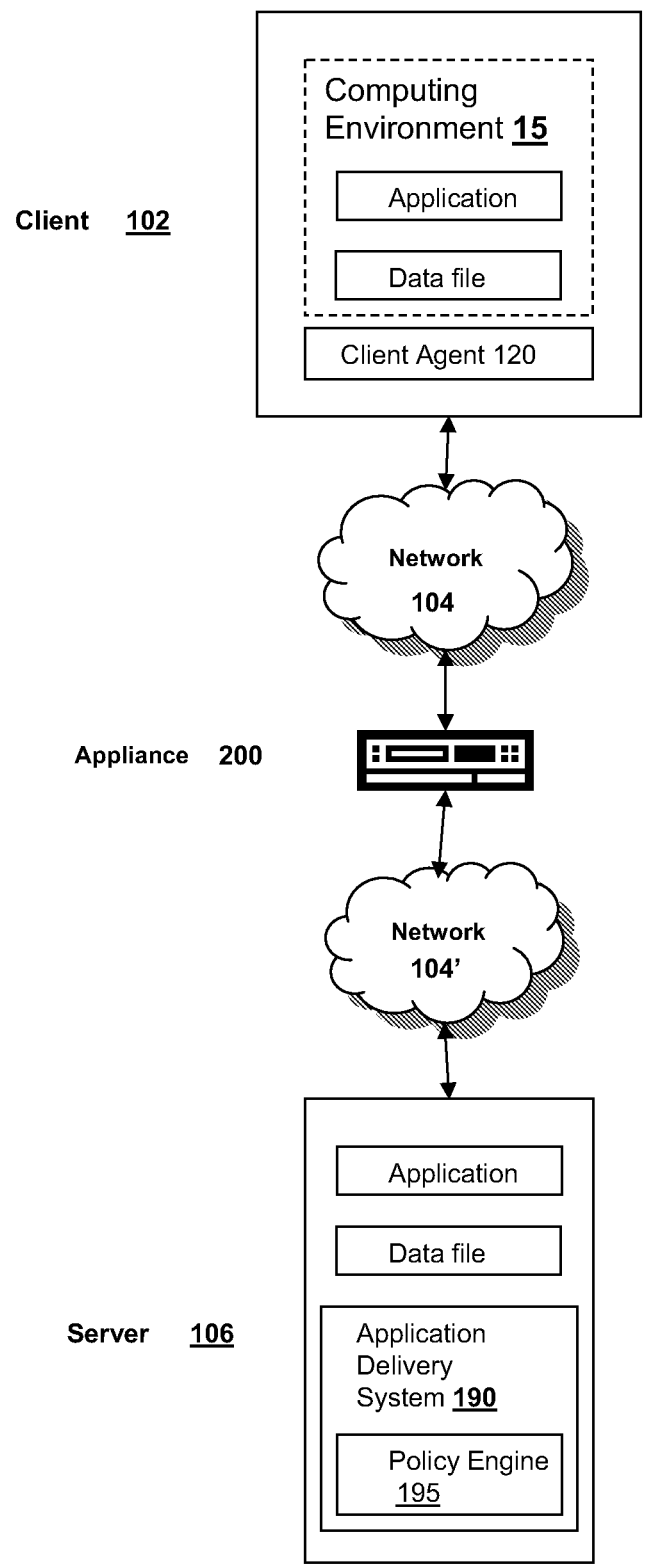
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
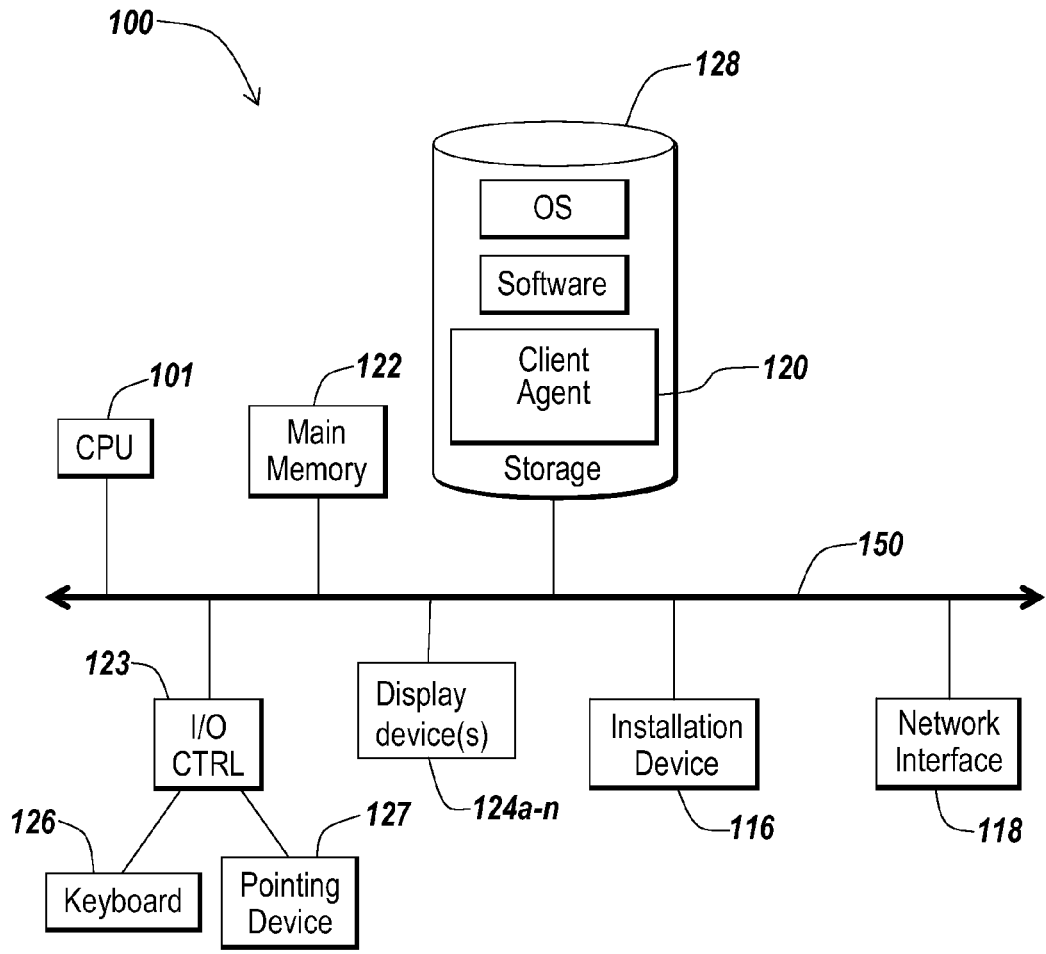
FIGS. 1C and 1D are block diagrams of embodiments of a computing device.
Figure 1D:
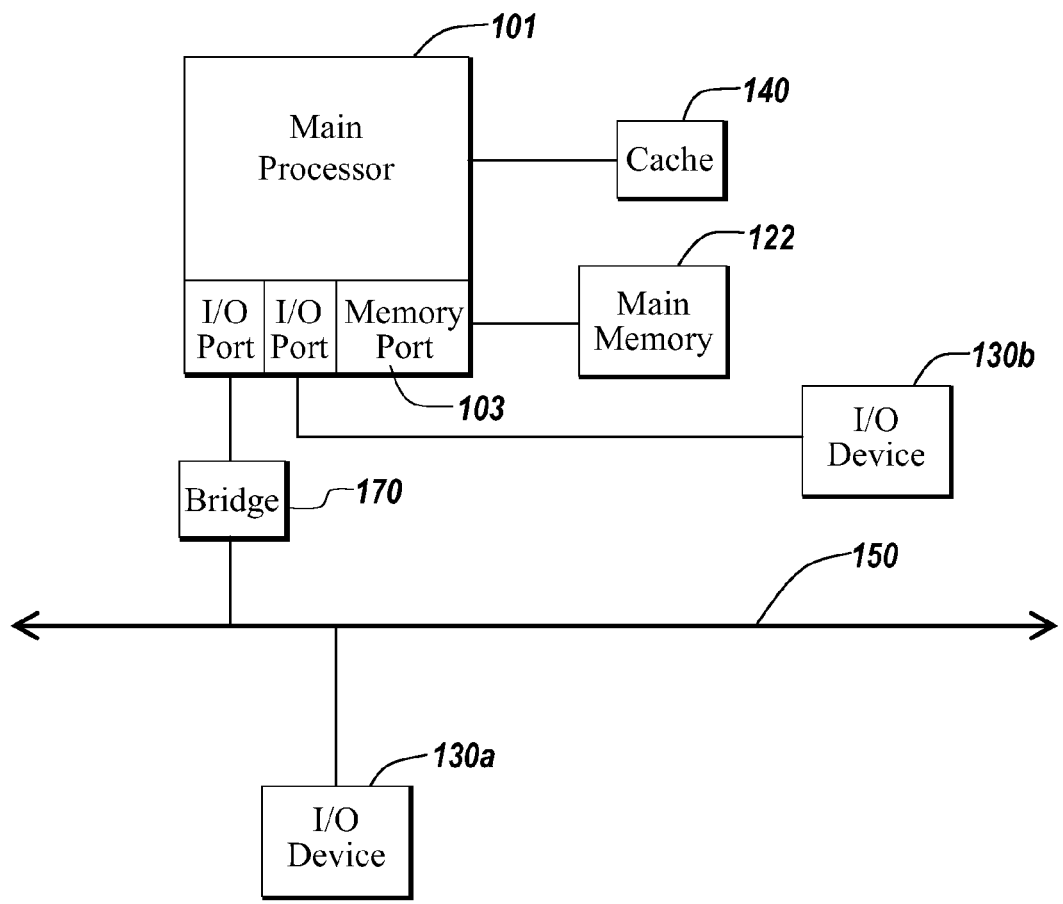

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
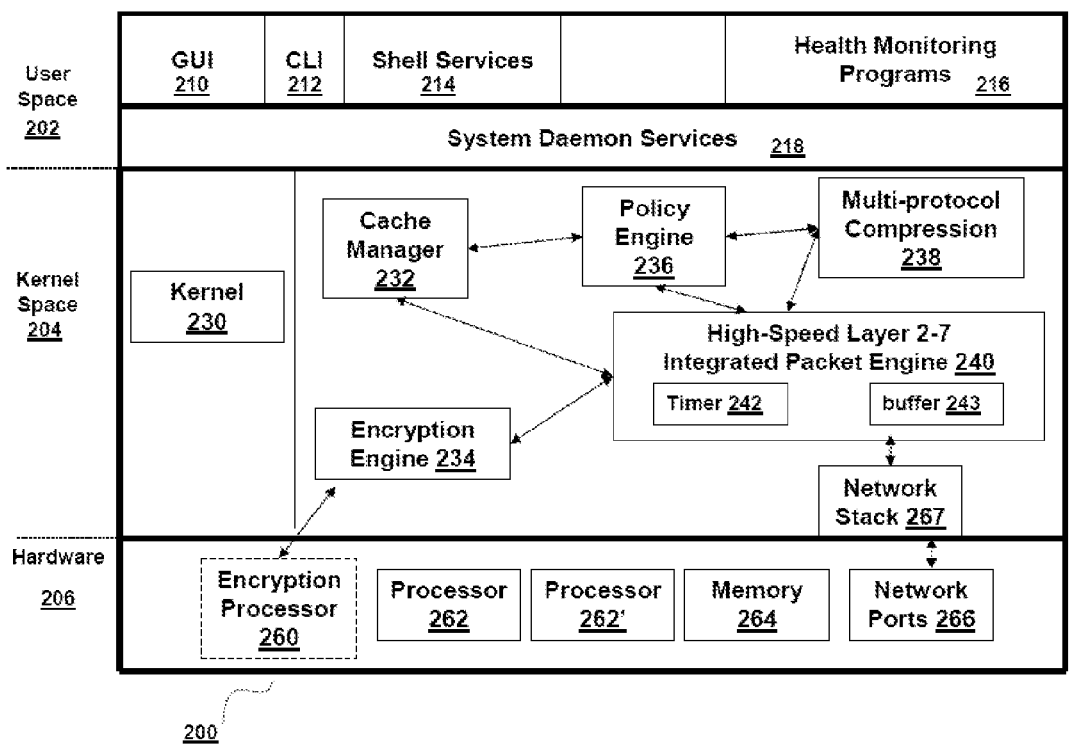
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application (s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable userselected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
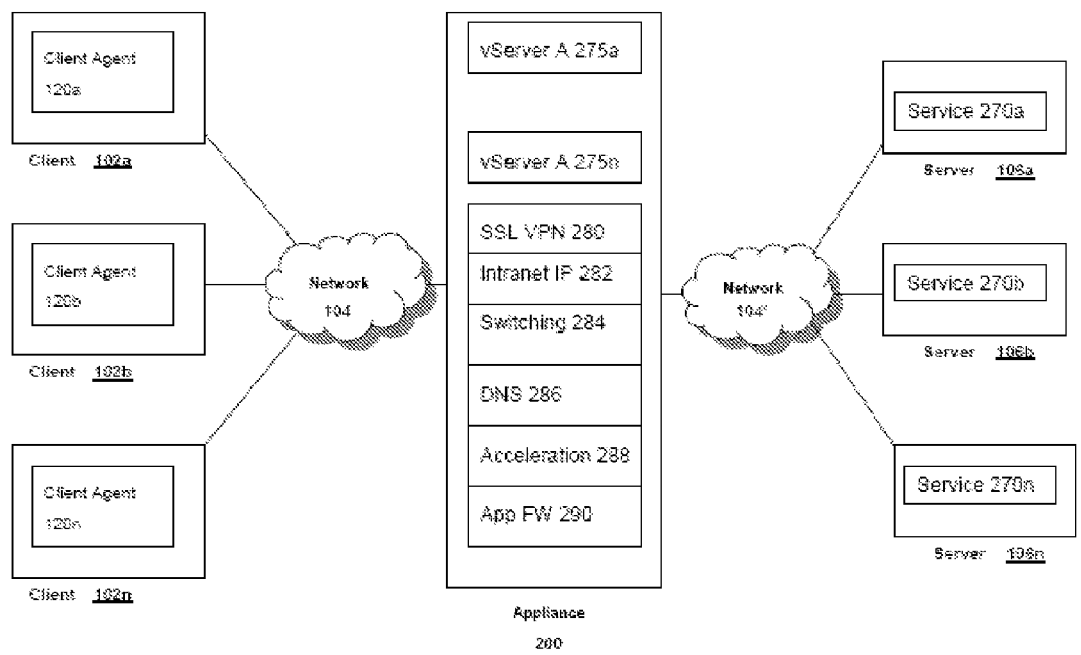
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of tranport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
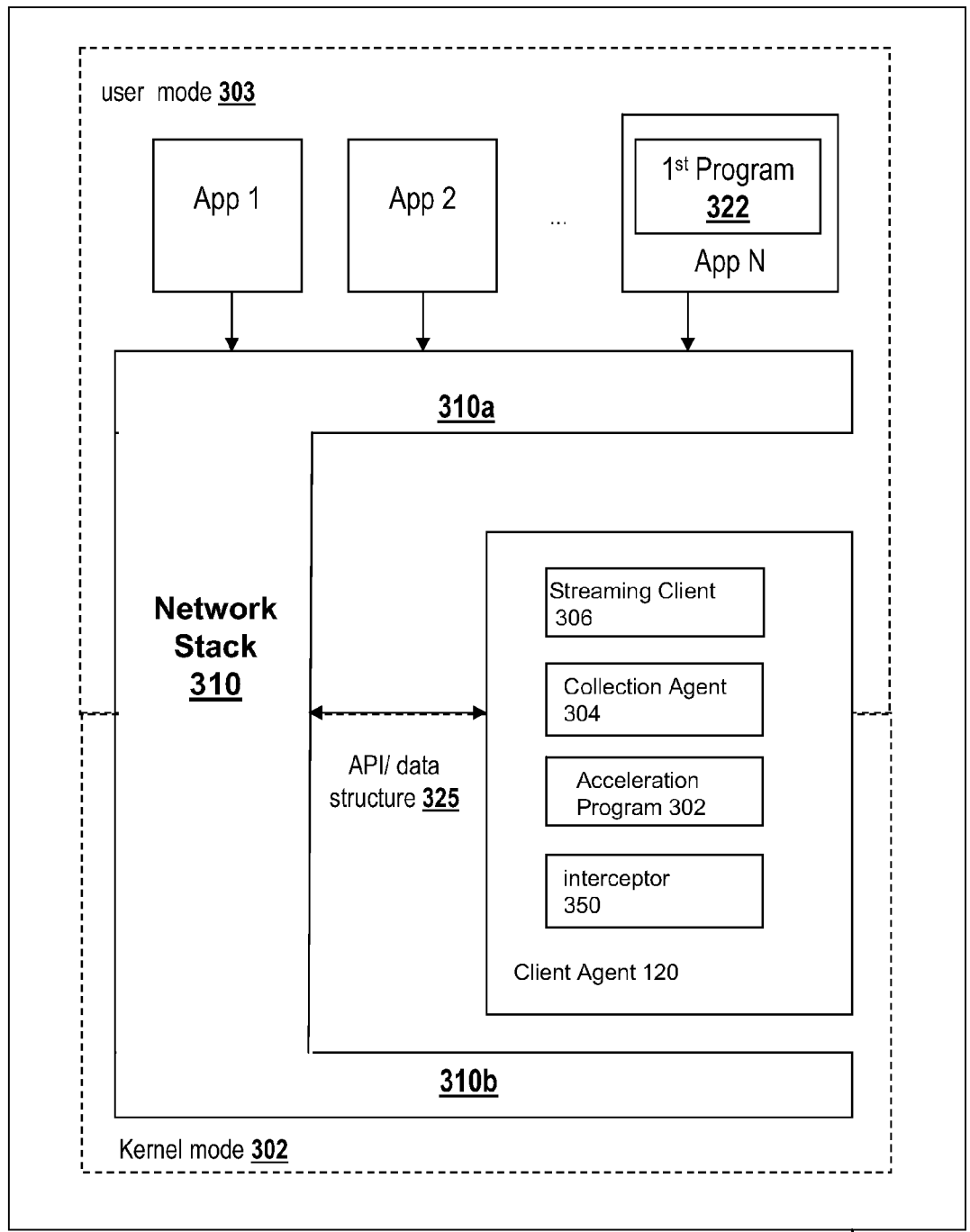
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as payload of network packet of the transport layer protocol The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Figure 4:
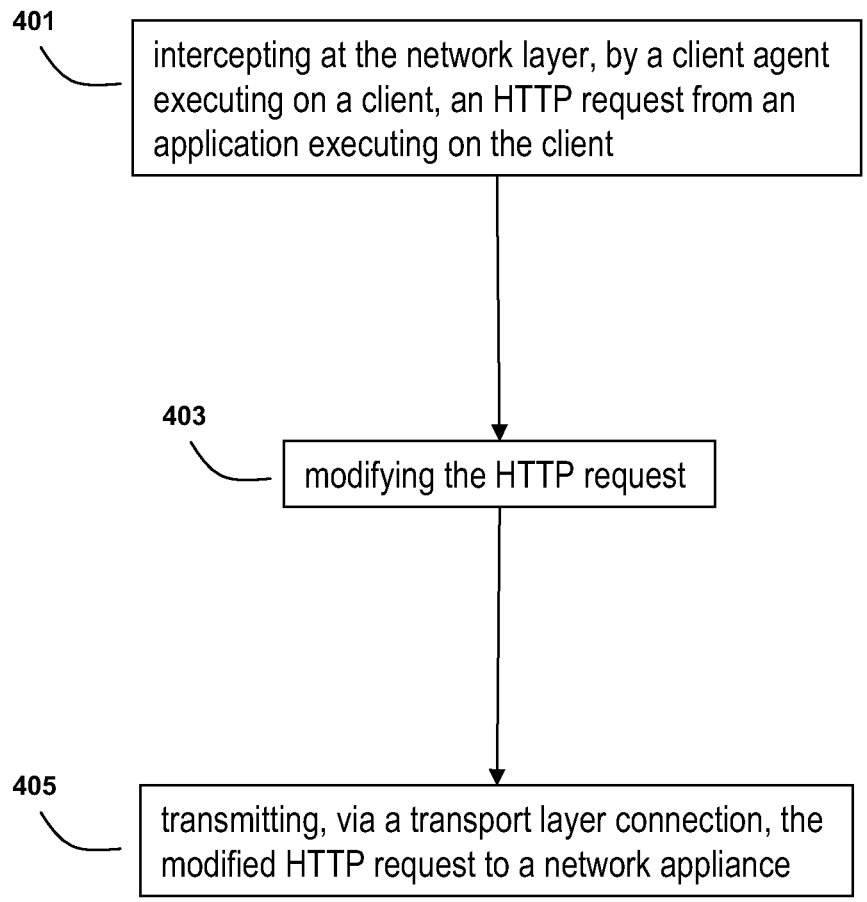
FIG. 4 is a block diagram of one embodiment of a method for using a client agent operating in a virtual private network environment to intercept HTTP communications.

Referring now to FIG. 4, one embodiment of a method for using a client agent 120 operating in a virtual private network environment to intercept HTTP communications is shown. In brief overview, the method comprises intercepting at the network layer, by a client agent 120 executing on a client, an HTTP request from an application executing on the client (step 401); modifying the HTTP request (step 403); and transmitting, via a transport layer connection, the modified HTTP request to a network appliance 200 (step 405).

Still referring to FIG. 4, now in greater detail, a client agent 120 executing on a client intercepts at the network layer an HTTP request from an application executing on the client (step 401). This interception may be performed by any means, including without limitation the use of a TDI driver as discussed herein. Although in the embodiment shown, the interception occurs at the network layer, in other embodiments, the interception may occur at the session layer or the transport layer. The application may comprise any application using the HTTP protocol, including without limitation web browsers and web applications.

In some embodiments the interception may be performed transparently to the user, the application, or both. In some embodiments the interception may be performed transparently to one or more layers of the network stack above or below the layer at which the interception occurs.

After intercepting at the network layer, by the client agent, an HTTP request from an application executing on the client (step 401); the client agent may modify the HTTP request (step 403).

In some embodiments, the client agent may modify the HTTP request by adding, removing, or modifying a cookie contained within the HTTP request. The client agent may add, remove, or modify a cookie in order to perform any of the functions associated with a client agent described herein.

In one embodiment, a client agent may add an HTTP cookie comprising authentication credentials to be transmitted to a VPN appliance 200 as described herein.

In another embodiment, a client agent may add an HTTP cookie comprising caching information. For example, a client agent may add an HTTP cookie comprising information that the client agent has stored a previous version of a requested resource. A network appliance receiving the inserted cookie may then transmit only the portions of the requested resource that have changed since the previously stored version. One specific method of caching which may employ this technique will be discussed beginning at FIG. 7.

In some embodiments, the client agent 120 may modify the HTTP request by adding, removing, or modifying a name-value pair contained in the HTTP request. These name-value pairs may be modified in conjunction with any of the functions performed by the client agent, including acceleration, pooling, caching, and security. In one embodiment, the client agent may name-value pairs in an HTTP header.

For example, a client agent may modify, add, or remove a value following the "connection" HTTP message header, to indicate that the client agent wishes to keep the HTTP connection open rather than closed. This may be done by inserting a "keep-alive" value, or removing a "close" value.

Or, for example, a client agent may modify, add or remove a value following a "referrer" HTTP message header for security purposes. Removing the "referrer" variable may be desired to minimize the knowledge website operators can gain about the client's browsing history.

Or, for example, a client agent may modify, add, or remove a value following a "authorization" HTTP message header. The client agent may insert or remove security credentials on behalf of the client in order to provide secure access to resources.

Or, for example, a client agent may modify, add, or remove a value following a "cache-control." This may be used to support or enhance any of the caching features described herein.

In some embodiments, the client agent may add, remove, or modify a name-value pair in a URL specified by the HTTP request, in accordance with any of the functions described herein. In still other embodiments, the client agent may rewrite the requested URL itself.

In some embodiments, the client agent may further determine a routing decision based on a URL specified in the HTTP header. For example, if a client is requesting a URL that corresponds to a file associated with a given application server, the client agent may route the client request directly to the application server.

After modifying the HTTP request (step 403) the client agent may transmit, via a transport layer connection, the modified HTTP request to a network appliance 200 (step 405). This transmission may occur via any transport layer protocols. In one embodiment, the HTTP request may be transmitted via an SSL connection to the network appliance 200. The client agent may perform any of the functions described herein on the transmission of the HTTP request, including acceleration and compression.

Figure 5:
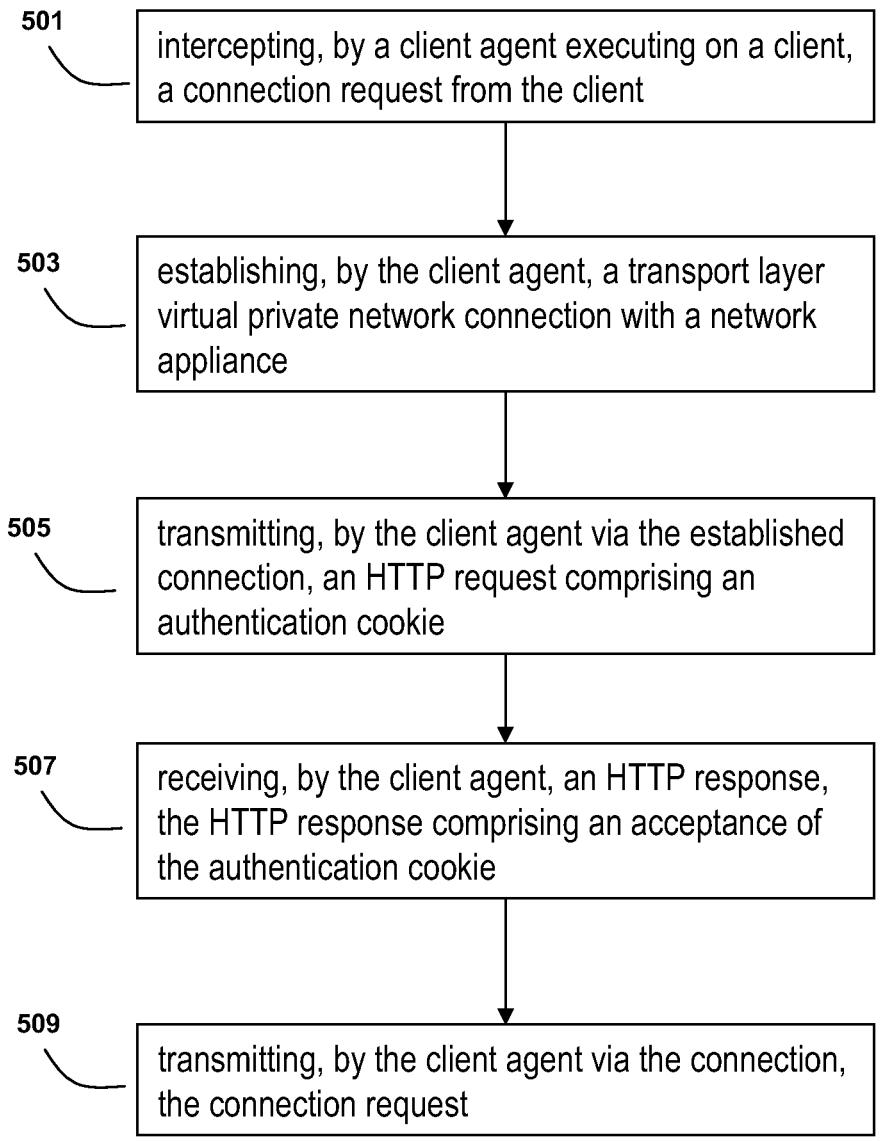
FIG. 5 is a block diagram of one embodiment of a method for using a client agent to enable HTTP cookie authentication.

Referring now to FIG. 5, one embodiment of a method for using a client agent to enable HTTP cookie authentication in non-HTTP communications from a client is shown. In brief overview, the method comprises: intercepting, by a client agent executing on a client, a connection request from the client (step 501); establishing, by the client agent, a transport layer virtual private network connection with a network appliance (step 503); transmitting, by the client agent via the established connection, an HTTP request comprising an authentication cookie (step 505); receiving, by the client agent, an HTTP response, the HTTP response comprising an acceptance of the authentication cookie; (step 507) and transmitting, by the client agent via the connection, the connection request (step 509).

Still referring to FIG. 5, now in greater detail, a client agent 120 executing on a client 102 intercepts a connection request from the client (step 501). This interception may occur via any of the methods discussed herein, including via a TDI driver. The connection request may comprise a request from the client to open any type of network connection, including non-HTTP connections. In one embodiment, the connection request may comprise a TCP SYN packet.

After intercepting a connection request from the client (step 501) the client agent may establish a transport layer virtual private network connection with a network appliance (step 503). This connection may comprise any transport layer protocol described herein. In one embodiment, the transport layer VPN connection may comprise an SSL connection. In some embodiments, the client agent may utilize a previously existing SSL VPN connection. In still other embodiments, the client agent may establish a new connection within a previously existing VPN connection. In these embodiments, the new connection may be pooled or multiplexed with other connections within the existing VPN connection.

After establishing the transport layer VPN connection (step 503), the client agent may transmit, via the established connection, an HTTP request comprising an authentication cookie (step 505). In some embodiments, the HTTP request may comprise an authentication cookie previously transmitted to the client by the network appliance. For example, a client agent may establish an SSL VPN connection with a network appliance 200, and may receive from the network appliance an authentication cookie. If the client agent desires to open a second connection with the network appliance, the client agent may then retransmit the received cookie, providing authentication without requiring a second logon procedure.

An authentication cookie may comprise any authentication information transmitted via an HTTP request. In one embodiment, the authentication cookie may comprise an authentication string, which allows the network appliance to verify the identity of a user of the client. In another embodiment, the authentication cookie may comprise an authentication string which allows the network appliance to verify a request corresponds to a particular user session. In still another embodiment, the authentication cookie may comprise an authentication string which allows the network appliance to verify a request corresponds to a particular application session.

In one embodiment, the client agent may ensure that the HTTP request comprising the authentication cookie is the first data sent via the new connection. For example, after the connection is established, the client agent may transmit an HTTP request "GET URL HTTP/1.1\r\n . . . " followed by an authentication cookie. In one embodiment, the client agent may queue any data the client attempts to send following the connection request until the HTTP request is transmitted. In another embodiment, the client agent may queue any data the client attempts to send following the connection request until an HTTP response is received from the network appliance.

After transmitting, via the established connection, an HTTP request comprising an authentication cookie (step 505); the client agent may receive an HTTP response, the HTTP response comprising an acceptance of the authentication cookie (step 507).

After receiving the HTTP response comprising an acceptance of the authentication cookie; (step 507) the client agent may transmit via the established connection, the connection request (step 509). The client agent may then perform any additional steps to service the connection request and establish the requested connection. The client agent may then transmit any data that had been queued for the requested connection.

Figure 6:
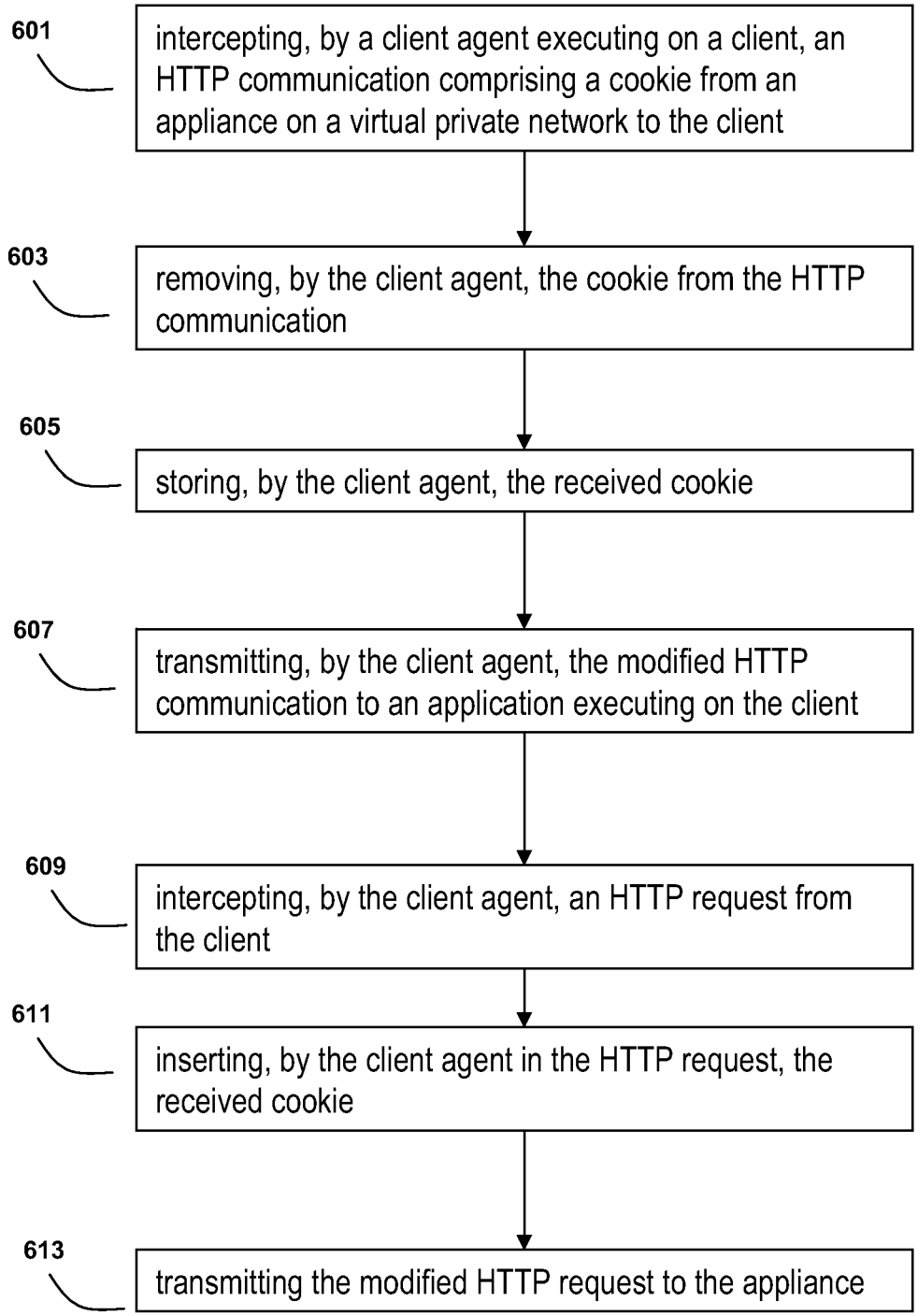
FIG. 6 is a block diagram of a method for using a client agent to enable secure authentication in a virtual private network environment using an HTTP cookie

Referring now to FIG. 6, a method for using a client agent to enable secure authentication in a virtual private network environment using an HTTP cookie is shown. In brief overview, the method comprises: intercepting, by a client agent executing on a client, an HTTP communication comprising a cookie from an appliance on a virtual private network to the client (step 601); removing, by the client agent, the cookie from the HTTP communication (step 603); storing, by the client agent, the received cookie (step 605); transmitting, by the client agent, the modified HTTP communication to an application executing on the client (step 607); intercepting, by the client agent, an HTTP request from the client (step 609); inserting, by the client agent in the HTTP request, the received cookie (step 611); and transmitting the modified HTTP request to the appliance (step 613).

Still referring to FIG. 6, now in greater detail, a client agent 120 executing on a client 102 intercepts an HTTP communication comprising a cookie from an appliance on a virtual private network to the client (step 601). This cookie may comprise any authentication credentials, including without limitation user-specific, session-specific, and application-specific authentication credentials. In some embodiments, the cookie may be transmitted from the appliance to the client in response to a logon request and associated information from the client. The client agent may intercept the communication using any means described herein, including a TDI driver.

After intercepting the HTTP communication comprising a cookie from an appliance on a virtual private network to the client (step 601); the client agent may remove the cookie from the HTTP communication (step 603). The client agent may delete the cookie from the HTTP response by removing the name-value pair or pairs in the HTTP header that comprise the cookie.

In some embodiments, the client agent may also add, remove, or modify other name-value pairs in the received HTTP header in accordance with any of the embodiments discussed herein. In one embodiment, the client agent may add, remove, or modify the HTTP header such that any information in the received HTTP header resulting from previous client agent alterations to an HTTP request is masked from the client. For example, a client agent may insert a name-value pair in an HTTP request identifying a plurality of versions of the requested resource which are currently cached on the client. The client agent may then receive an HTTP response comprising a file consisting of changes from one of the identified versions, as well as a name-value pair in the HTTP header identifying which version was used as the base. The client agent may remove this name-value pair in addition to assembling the updated version such that the caching techniques are transparent to the client application.

After removing, by the client agent, the cookie from the HTTP communication (step 603); the client agent may store the received cookie (step 605). The client agent may store the received cookie using any storage method or device. In one embodiment, the client agent may store the cookie as a file on disk. In another embodiment, the client agent may store the cookie in RAM. The client agent may use any methods of sorting or indexing the stored cookie, including without limitation indexing by user, session, application, appliance, connection, or VPN.

After storing the received cookie (step 605) the client agent may then transmit the modified HTTP communication to an application executing on the client (step 607). The modified HTTP communication may be transmitted to the client using any means described herein, including a TDI driver.

After transmitting the modified HTTP communication to an application executing on the client, the client agent may intercept an HTTP request from the client (step 609). The interception may occur via any of the means discussed herein, including a TDI driver. The HTTP request may be from the application the HTTP response was transmitted to, or the HTTP request may be from a second application. In some embodiments, the client agent may intercept HTTP requests from a plurality of applications.

After intercepting an HTTP request from the client (step 609) the client agent may then insert, in the HTTP request, the received cookie (step 611). The client agent may insert the HTTP cookie by searching a file, directory, or database for the received cookie, and then inserting the cookie into the request. In some embodiments, the client agent may contain an HTTP parser such that the client agent can identify the payload boundary of the HTTP request.

After inserting, in the HTTP request, the received cookie (step 611); the client agent may transmit the modified HTTP request to the appliance (step 613). This transmission may via any method described herein. In some embodiments, the client agent may then receive an HTTP response from the appliance indicating the cookie is accepted.

In some embodiments, the client agent may provide further cookie management functionality. For example, the client agent may detect when a VPN session has ended, and delete any stored cookies corresponding to the VPN session.

Referring now to FIGS. 7 through 11, a detailed example of a caching and update method is shown which may utilize any of the client cookie management and HTTP aware functionality previously discussed.

Figure 7:
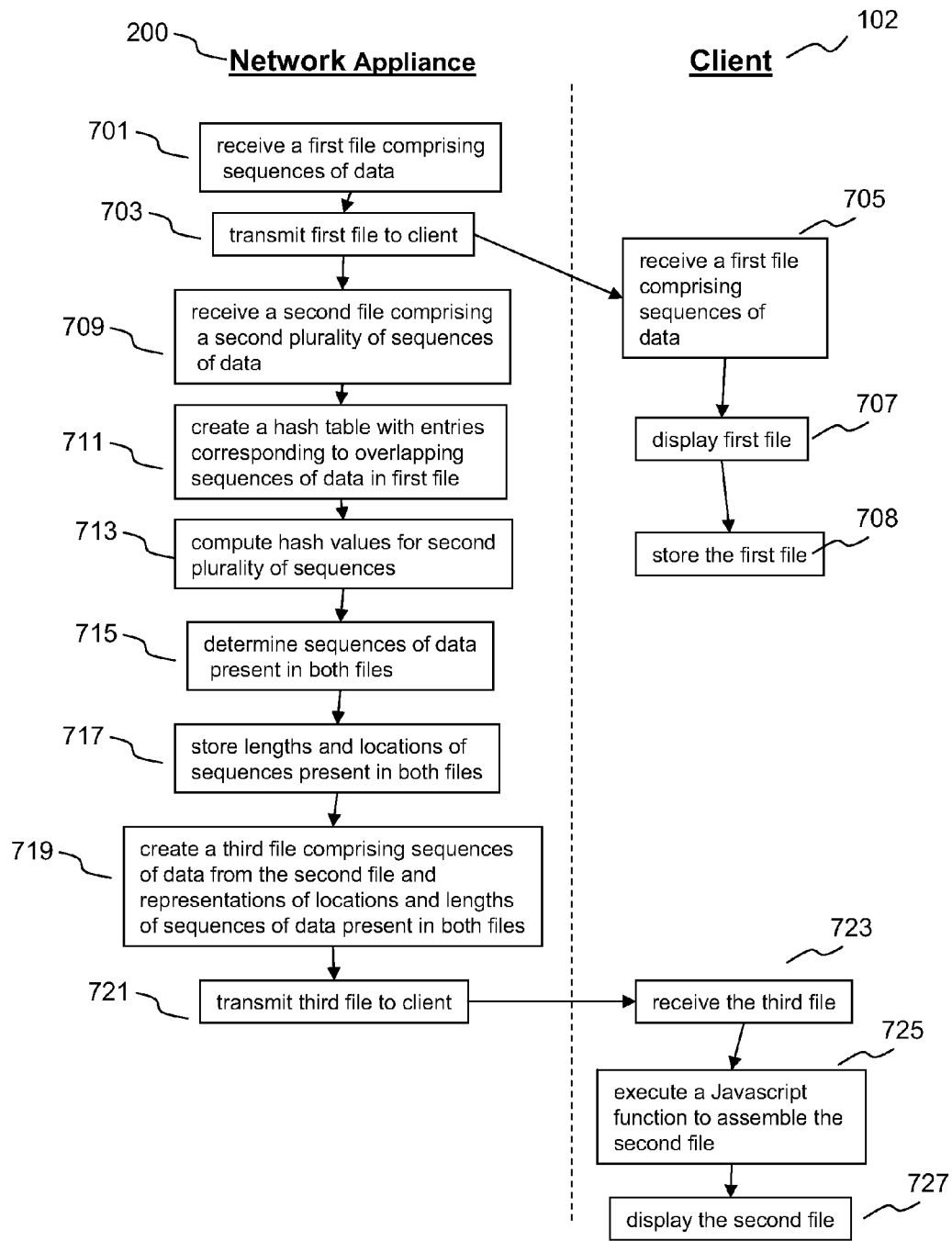
FIG. 7 is a flow diagram depicting one embodiment of a method for creating an efficient update to a previously stored file.

Referring now to FIG. 7 one embodiment of a method for creating an efficient update to a previously stored file is shown. Although FIG. 7 depicts the method in the context of being performed by a network appliance 200 and a client 102, the method may be performed by any of the computing devices discussed herein either alone or in any combination. In brief overview, the method comprises: receiving a first file comprising a first plurality of sequences of data (step 701); transmitting the first file to a client or client agent (step 703); receiving a second file comprising a second plurality of sequences of data (step 709); creating a hash table having a plurality of entries, each of the plurality of entries corresponding to a respective one of the first plurality of sequences, and wherein at least two of said entries correspond to overlapping sequences of data (step 711); computing hash values for said second plurality of sequences of data (step 713); comparing each of the second plurality of sequences of data with sequences from the first plurality of sequences having the same hash value to determine sequences of data present in both files (step 715); storing representations of lengths and locations of said sequences of data present in both the first and second files (step 717); creating a third file comprising sequences of data from the second file and representations of locations and lengths of said sequences of data present in both the first and second files (step 719); and transmitting the third file to a client or client agent (step 721).

Still referring to FIG. 7, and now in greater detail, the network appliance 200 receives a first file comprising a first plurality of sequences of data (step 701). In some embodiments the first file may be received from a network 211', from a server 205, from a database, or from any combination thereof. In some embodiments the first file may be read from a disk or other storage medium, retrieved from a cache, or accessed from RAM. In other embodiments the first file may be received from an application or process executing on the network appliance 200. In some embodiments, the first file may comprise a file requested by a client or client agent.

The first file may comprise sequences of data corresponding to sequences of bits or bytes comprising the file. The first file may comprise any file protocol, including without limitation, HTML, XML, WML, SVG, other document protocols, image file protocols, sound file protocols, video file protocols, and binary file protocols. In some embodiments the file comprises a web page or a portion of a web page. In some embodiments the file comprises any web page that is updated with some frequency, including without limitation a news page, a web application page, a chat room, a bulletin board, a sports page, an e-mail page, a directory listing, a tracking page, and a webcam page. After receiving the first file, the network appliance 200 may store or cache the first file to permit later retrieval. In some embodiments the network appliance 200 may modify said first file in accordance with any of the network appliance functions described herein.

In some embodiments, after receiving the first file (step 701), the network appliance 200 transmits the first file to a client (step 703). The network appliance 200 may transmit the first file via any of the networks, or protocols described herein, and to any of the clients or client agents described herein. The network appliance 200 may modify the first file in accordance with any of the functions performed by the network appliance, including compression, acceleration and encryption. Although FIG. 7 depicts the network appliance 200 transmitting the first file immediately after step 701, in other embodiments said transmittal could occur after any of the steps (steps 705-721) occurring after the network appliance 200 receives the first file (step 701).

In some embodiments, the network appliance 200 may store a record of said transmission. Said record may be stored in any memory element, including a data base or cache. In one embodiment, the network appliance 200 may access said cache to determine whether a given file has been previously transmitted to a client. In one embodiment, said records may be set to expire after a set amount of time. For example, if a network appliance 200 has information indicating that a given client 102 deletes all files from its cache at the end of each day, the network appliance may set all records of files transmitted to the client 102 to expire at the end of each day.

In the embodiment shown, after the network appliance 200 transmits the first file to the client 102 (step 703), the client may then receive the first file (step 705), display the first file (step 707), and store the first file (step 708). The client may perform these steps in accordance with any of the embodiments described herein.

In the embodiment shown, after the network appliance 200 transmits the first file to the client 102 or client agent 120 (step 703), the network appliance receives a second file comprising a second plurality of sequences of data (step 709). In other embodiments, the network appliance 200 may receive the second file (step 709) before or during the transmission of the first file to the client (step 703). The second file may comprise any of the file types, protocols, web pages and portions of web pages discussed herein. After receiving the second file, the network appliance 200 may store or cache the second file to permit later retrieval. In some embodiments the network appliance 200 may modify said second file in accordance with any of the network appliance functions described herein.

In some embodiments, the second file may comprise a file requested by a client agent. In one embodiment, the client agent may transmit a request to the network appliance for the second file, the request comprising information identifying that the client agent has a stored copy of the first file. In some embodiments, this request may be an HTTP request. For example, a client agent may transmit an HTTP request for a news web page. The client agent may insert in the HTTP request the following name-value pair "previously-stored-version=826482764" where 826482764 may comprise a serial number or timestamp corresponding to a prior version of the news web page stored earlier (an thus corresponding to the first file discussed with respect to this figure). The appliance 200 may then use this serial number or timestamp to retrieve the first file from its own storage.

After receiving the second file comprising a second plurality of sequences of data (step 709), the network appliance may create a hash table having a plurality of entries, each of the plurality of entries corresponding to a respective one of the first plurality of sequences, and wherein at least two of said entries correspond to overlapping sequences of data (step 711). Said hash table may be created according to any known hash table algorithm which provides functionality to store sequences of data or references to sequences of data as entries and then efficiently search said table for entries matching a given sequence. In other embodiments, the network appliance may create the hash table (step 711) before or during receiving the second file (step 709).

In some embodiments, the entries in the hash table may correspond to sequences of data from the first file comprising sequences of bytes. The sequences of bytes may be of any length. In one embodiment the sequences are four-byte sequences.

In the embodiment shown, at least two of the hash table entries correspond to overlapping sequences of data. Overlapping sequences may have any number of bytes in common. For example if the file comprised the sequence "abcdefghijklmnop", examples of overlapping four-byte sequences include "cdef" and "defg" in addition to "cdef" and fghi." In one embodiment, the hash table entries correspond to successive overlapping byte sequences. For example, if the file comprised the sequence "abcdefg", a hash table comprising at least two successive overlapping four-byte sequences may include entries corresponding to the sequences "abcd" "bcde" "cdef" and "defg".

In some embodiments, the hash table entries at a given time may only correspond to sequences of data from a given portion or "window" of the first file. This allows the size of the hash table to be smaller than the hash table might be if the entire file was hashed at once. In some embodiments, only the first X bytes of the first file are hashed, and then, upon occurrence of some conditions, Y entries are removed from the table followed by Y more entries being added to the table. In one embodiment a window size of 64 kilobytes is used, and upon occurrence of certain conditions, the window is moved by 32 kilobytes. In this embodiment, the sequences from the first 64 kilobytes of the first file are hashed, and then upon occurrence of certain conditions, the entries corresponding sequences from the first 32 kilobytes of the file are removed, and entries corresponding to sequences from the next 32 kilobytes of the file are added.

The conditions upon which the hash window are moved may be any conditions which improve the execution time, performance, or compression of the hashing algorithm. In one embodiment, the window is moved when matches have been found for more than 85% of the sequences in a given half of the window. In another embodiment, the window is moved when a given percentage of the second file has been compared with the existing hash entries. In one embodiment, the window is moved when hash values have been computed and compared for a proportionate portion of the second file compared to the first file. For example, if the first file is 100 kilobytes, and the second file is 80 kilobytes, the hash window may be moved when 80/100*64 kilobytes of the second file has been compared to sequences in the hash table.

After the network appliance 200 creates a hash table (step 711), the network appliance 200 may then compute hash values for said second plurality of sequences of data (step 713). Said hash values may be computed according to the same method used to compute hash values for the first plurality of sequences. The network appliance 200 may choose sequences of data from the second file in the same manner in which the network appliance chose sequences of data from the first file. For example, if the network appliance 200 created hash table entries corresponding to successive overlapping four-byte sequences from the first file, the network appliance may choose to compute hash values for successive overlapping four-byte sequences from the second file.

After computing hash values for some or all of the second plurality of sequences of data (step 713) the network appliance 200 may compare each of the second plurality of sequences of data with sequences from the first plurality of sequences having the same hash value to determine sequences of data present in both files (step 715). The network appliance may perform this step in accordance with any hashing algorithm presently available. Said comparisons may comprise a comparison of subsequent bytes of matched sequences to determine longer matches. For example, the first file may comprise the sequence "abcdefghijklmno" and the second file may comprise the sequence "zyxwvutcdefghituv." If the hashing is done on successive four-byte sequences, the network appliance 200 may determine that the sequence "cdef" is present in both files. The network appliance 200 may then compare subsequent bytes of the matched sequences to determine that the sequence "cdefghi" is present in both files. Thus in some embodiments the lengths of the sequences determined to be present in both files may vary from the lengths of the sequences for which hash values are computed. In some embodiments a minimum and maximum length on matching sequences may be set.

After determining sequences of data present in both files (step 715) the network appliance 200 may store representations of lengths and locations of said sequences of data present in both the first and second files (step 717). The network appliance 200 may store said representations in any storage medium, including a cache, RAM, a disk, or tape. In some embodiments, the network appliance 200 may store said representations on the network appliance 200 itself. In other embodiments, the network appliance 200 may store said representations on another computing device 100. In some embodiments, lengths and locations of a sequences of data may be stored while the network appliance 200 is comparing each of the second plurality of sequences of data with sequences from the first plurality of sequences having the same hash value (step 713). In other embodiments a minimum length may be required for the length and location of a given sequence to be stored. In one embodiment, the minimum length may be specified to be four bytes.

The representations of lengths and locations of said sequences present in both files may comprise any representation which identifies a length and location of a sequence. In some embodiments the locations of said sequences are stored as absolute locations within a file. In other embodiments, the locations of said sequences are stored as locations relative to a given reference pointer within said first file. In one embodiment, said reference pointer may be fixed, in another embodiment said reference pointer may move according to a rule set.

In one embodiment the reference pointer may be initially set to point to the beginning of the first file. The pointer may then be incremented every time a matching sequence of longer than 5 bytes is found. The pointer may then be incremented to point to the last byte plus one of the matching sequence in the first file. In this embodiment, locations of said sequences present in both files are stored as a given number bytes, positive or negative, from the position of the reference pointer.

In some embodiments, the lengths and locations of the matched sequences are stored as fixed length integers. In one embodiment, the length of a matched sequence is stored as a 1 byte integer, wherein the integer represents a length of between 4 to 1027 bytes. In this embodiment, byte-lengths of matched sequences are restricted to multiples of 4. In other embodiments, any other bit or byte length integers may be used to store said sequence lengths. In still other embodiments, any other restrictions may be imposed on byte-lengths of matched sequences, including minimum and maximum lengths, and limiting byte lengths to given multiples. In still other embodiments, lengths of matched sequences may be stored as variable length integers. In some embodiments locations of matched sequences may be stored as variable length integers. In other embodiments, locations of matched sequences are stored as fixed length integers of a given byte or bit length.

After the network appliance 200 stores representations of lengths and locations of said sequences of data present in both the first and second files (step 717), the network appliance 200 may create a third file comprising sequences of data from the second file and representations of locations and lengths of said sequences of data present in both the first and second files. Said creation (step 717) may occur after all the lengths and locations of matched sequences are stored, or said creation (717) may occur contemporaneously as matched sequences are found. The third file may contain representations of lengths and locations in any format discussed herein. In some embodiments lengths and locations of shared sequences may be preceded by special byte or bit sequences.

For example, if a first file comprised the string "abcdefghijklmnop," and the second file comprised the string "xxxxxxxdefghijkxxxxxxcdefxxx", the third file may comprise the sequence "xxxxxxx3,8xxxxxx2,4xxx". In this example 3,8 is used to indicate a representation indicating the sequence from the first file starting at byte 3 and 8 bytes long (in some embodiments this representation could be two fixed-length binary integers). Likewise 2,4 indicates that a representation indicating the sequence from the first file starting at byte 2 and 4 bytes long.

As another example, if the first file comprised the string "abcdefghijklmnop," and the second file comprised the string "xxxxxxxdefghijkxxxxxxcdefxxx", the third file may comprise the sequence "xxxxxxx3,8xxxxxx-9,4xxx". In this example, locations of shared sequences are stored as relative distances from a reference pointer, incremented according to the method described above. In this example, the network appliance 200 indicates the first matched sequence in the same manner as the previous example, since the reference pointer initially points to the beginning of the first file. The reference pointer would then be incremented to point to location of the last byte plus one of the matching sequence in the first file. Thus, the second matched sequence is indicated with −9,4 which indicates that the second matched sequence occurs nine bytes prior to the byte following the previous matched sequence in the first file.

In one embodiment, the third file may be encoded in a byte protocol, such as ASCII. In one embodiment, each group of 7 bytes of binary data may be encoded as 8 bytes of ASCII characters. This conversion may be done by any known conversion method. The ASCII characters may correspond to any existing character set definition, including ISO-8859-1. In some embodiments, the third file may comprise an HTML file. In one embodiment, the third file may comprise a Javascript variable comprising said sequences of data from the second file and representations of locations and lengths of said sequences of data present in both the first and second files. In one embodiment, the third file may also comprise a Javascript function comprising functionality for assembling said second file by processing said Javascript variable. In another embodiment the third file may contain a reference to a Javascript function comprising said functionality.

The following HTML code illustrates one example of a third file that may be transmitted to a client.

```
<HTML>
  <HEAD>
    <SCRIPT>
        var updateFile = "~~~~~ "
```

```
       <SCRIPT>
    </HEAD>
       <BODY onload=createPage( updateFile )>
       </BODY>
    </HTML>
```

In the above example, an HTML file comprises a Javascript variable named "updateFile." Said variable may comprise sequences of data from the second file and representations of locations and lengths of said sequences of data present in both the first and second files. The example above also comprises a call to a Javascript function named "createPage." Said function, which may either be included with the HTML file or stored on the client, may comprise functionality for assembling said second file using the data from the Javascript variable "updateFile." In the example above, a standard HTML browser would execute the "createPage" function upon loading the HTML page. The "createPage" function may also comprise functionality for altering the HTML page to display said second file once the second file is assembled.

After creating a third file comprising sequences of data from the second file and representations of locations and lengths of said sequences of data present in both the first and second files (step 719); and the network appliance 200 may transmit the third file to a client (step 721). Said transmission may occur via any of the networks and methods discussed herein. The network appliance 200 may modify the third file in accordance with any function performed by the network appliance 200 including compression, acceleration and encryption.

In some embodiments, the network appliance 200 may transmit information in the HTTP header of the transmission corresponding to the second file. To continue a previous example, the network appliance might insert the name-value pair "previously-stored-version=826482764" to indicate which version of the file was used as the first file for purposes of the file comparison and compression.

After transmitting the third file to a client (step 721), the client 102 may receive the third file (step 723); execute a Javascript function to recreate the second file comprising sequences of data from the second file and sequences in the first file indicated by the third file (step 725); and display the second file (step 727). The client 102 may perform these steps in accordance with any of the embodiments described herein.

Figure 8:
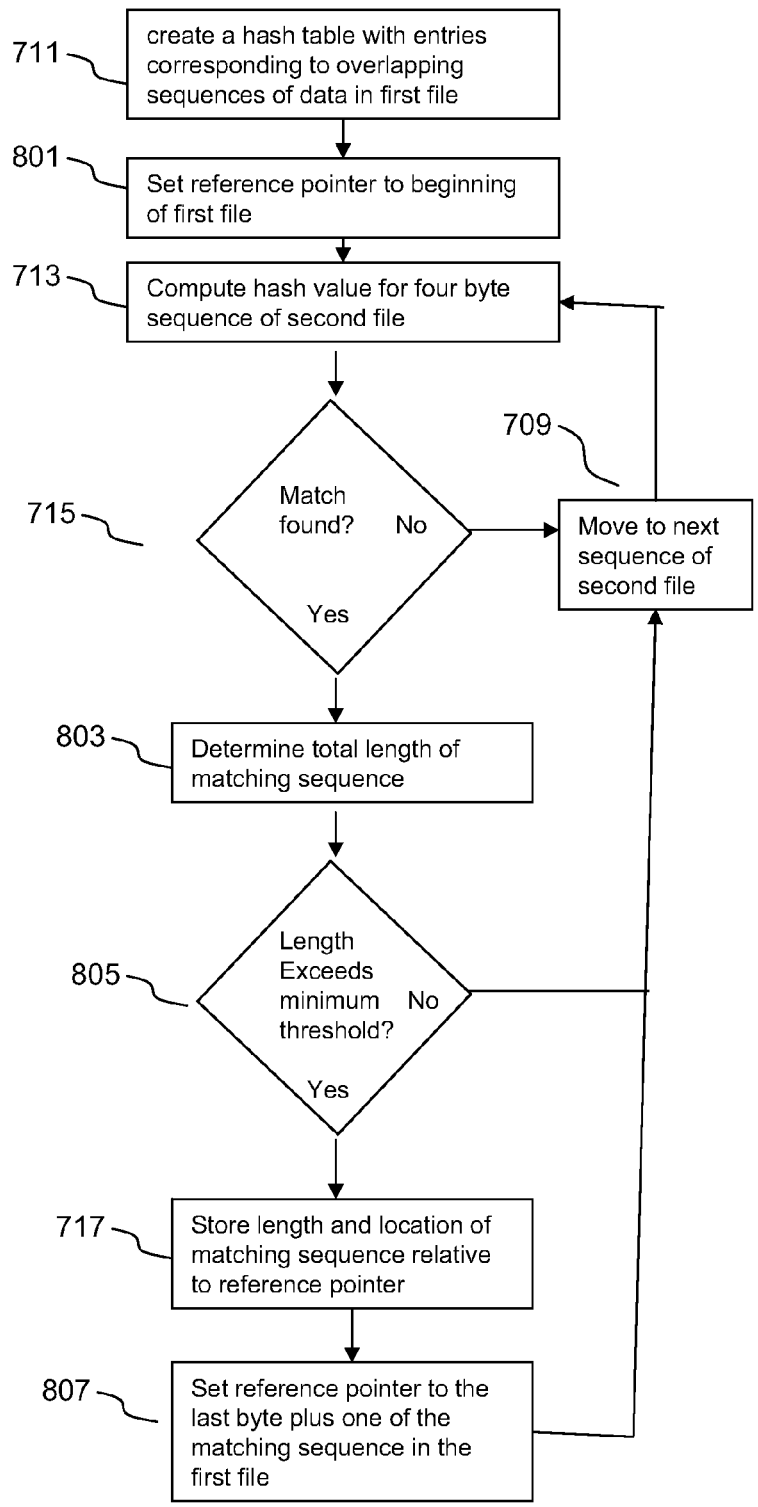
FIG. 8 is a flow diagram depicting another embodiment of a method for creating efficient updates to a previously stored file.

Referring now to FIG. 8, a flow diagram depicting another embodiment of a method for creating efficient updates to a previously stored file is shown. In brief overview, the method comprises creating a hash table with entries corresponding to overlapping sequences of data in a first file (step 711); setting a reference pointer to the beginning of said first file (step 801); computing a hash value for a sequence of data in a second file (step 713); and determining whether said sequence is present in both files (step 715). The method may then comprise either moving to the next sequence in the second file (step 809) or determining a total length for the matching sequence (step 803) and determining whether said length exceeds a minimum threshold (step 805). The method may then comprise either moving to the next sequence in the second file (step 809) or storing the length and location of the matching sequence relative to reference pointer (step 717). The method may then comprise setting the reference pointer to the last byte plus one of the matching sequence in the first file (step 807) and then moving to the next sequence in the second file (step 809). In the embodiment shown, the method may be performed by a network appliance 200.

Still referring to FIG. 8, now in greater detail, a network appliance 200 creates a hash table with entries corresponding to overlapping sequences of data in a first file (step 711). This step may be performed in accordance with any of the methods for creating a hash table described herein.

After creating a hash table with entries corresponding to overlapping sequences of data in a first file (step 711) the network appliance 200 may set a reference pointer to the beginning of said first file (step 801). The reference pointer may comprise any type of pointer.

After setting a reference pointer to the beginning of said first file (step 801), the network appliance 200 may compute a hash value for a sequence of data in a second file (step 713). This step may be performed in accordance with any of the methods for computing a hash value described herein.

After computing a hash value for a sequence of data in a second file (step 713), the network appliance 200 may determine whether said sequence is present in both files (step 715). This step may be performed in accordance with any of the methods described herein.

If a sequence is not present in both files, the network appliance 200 may move to the next sequence of the second file (809). Said next sequence may comprise any sequence occurring after the given sequence in the second file. In one embodiment, the next sequence may be the sequence starting one byte after the previous sequence. In another embodiment, the next sequence may be the sequence starting any other number of bytes after the previous sequence. In some embodiments moving to the next sequence of the second file (step 809) may be accompanied by moving a hash window as described previously herein. If no next sequence exists, the method may terminate.

If a sequence is present in both files, the network appliance 200 may determine a total length of a matching sequence by comparing subsequent bytes of the matched sequences (step 803). The total length may be determined in accordance with any of the methods described herein.

The network appliance 200 may then determine if the total length of the matching sequence exceeds a given threshold (step 805). This determination may be made in accordance with any of the methods described herein. If the length of the matching sequence does not exceed the minimum threshold, the network appliance 200 may move to the next sequence of the second file.

If the length does exceed the minimum threshold, the network appliance 200 may then store the length and location of the matching sequence relative to the given reference pointer in accordance with any of the methods discussed herein. The network appliance 200 may then increment the reference pointer according to any of the methods described herein (step 807). The network appliance 200 may then move to the next sequence of the second file (step 809).

Figure 9:
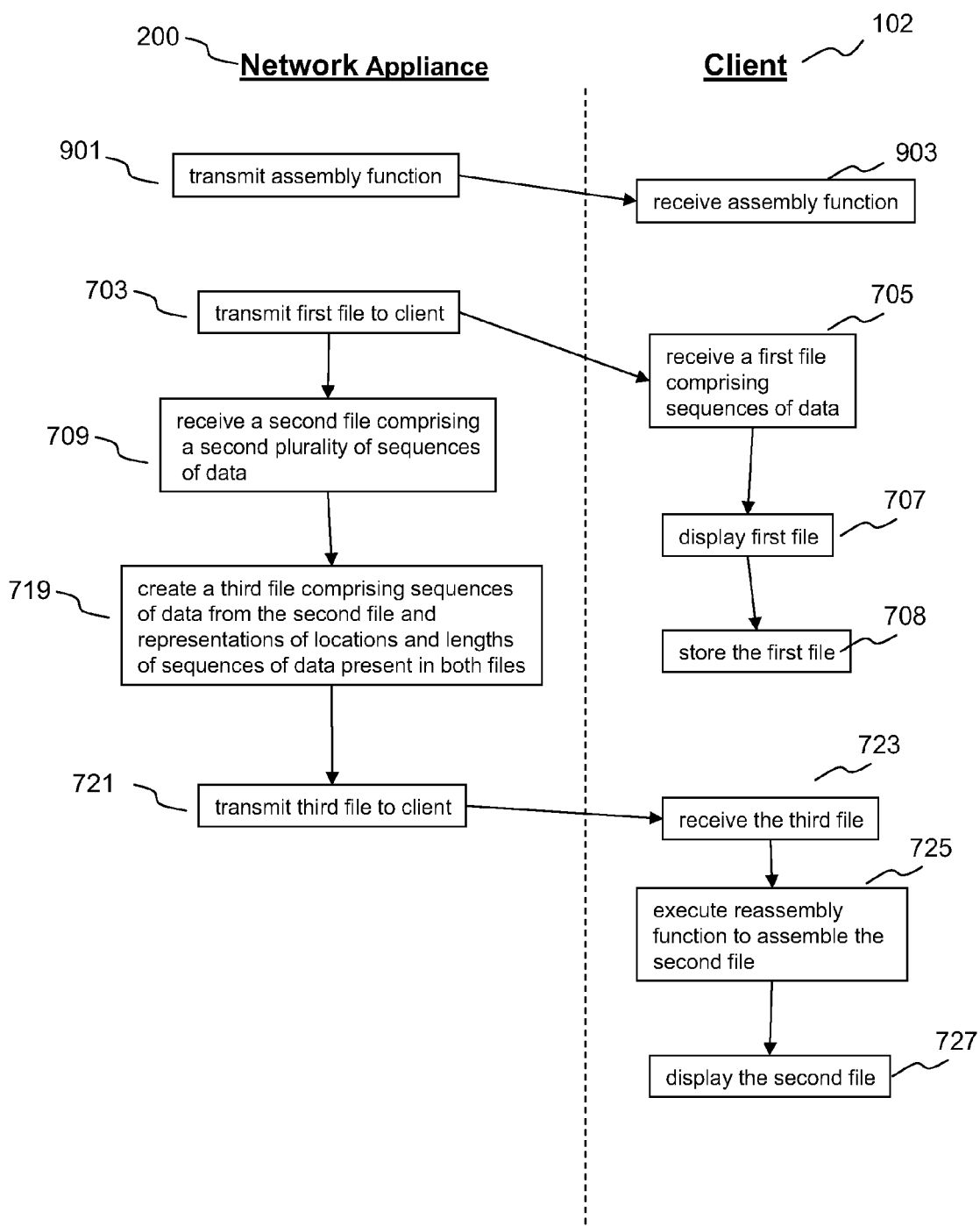
FIG. 9 is a flow diagram depicting another embodiment of methods for creating and receiving efficient updates to a previously stored file.

Now referring to FIG. 9, one embodiment of a method for efficiently receiving updates to previously stored files is depicted. In brief overview, said method comprises: receiving a assembly function (step 903), receiving a first file comprising sequences of data (step 705); displaying said first file; storing said first file (step 708); receiving a third file comprising sequences of data and representations of locations and lengths of sequences in the first file (step 723); executing a Javascript function to create a second file comprising sequences of data from the second file and sequences in the first file indicated by the third file (step 725); and displaying said second file (step 727).

Still referring to FIG. 9, now in greater detail, a network appliance 200 may transmit a assembly function. Said assembly function may comprise any computer readable program means for assembling a second file using a file comprising sequences of data from a second file and representations of locations and lengths of said sequences of data present in both a first and second files. Said assembly function may comprise any programming or scripting language, including Javascript, or Java. In some embodiments, the assembly function may be transmitted in accordance with any of the other network appliance functions described herein. In one embodiment, the assembly function may be included in a program providing other client-side acceleration functionality.

In the embodiment shown, after the network appliance 200 transmits a assembly function (step 901), a client 102 or client agent 120 receives the assembly function (step 903). The client may receive said assembly function via any of the networks, protocols, or computing devices described herein. In some embodiments, the client 102 receives the assembly function from a network appliance 200. In one embodiment, the assembly function may be included as part of a client-side acceleration program. In other embodiments, the assembly function may be installed on the client 102 via any means of transferring software, including via a disk or other portable storage device. In some embodiments, a client agent 120 may receive and later execute the reassembly function such that the operation of the reassembly function is transparent to one or more applications or network layers.

In the embodiment shown, after receiving a assembly function (step 903), the client 102 or client agent receives a first file comprising sequences of data. In the embodiment shown, the client 102 receives the first file from a network appliance 200. In other embodiments, the client 102 may receive the first file from any computing device. Said file may comprise any file type or protocol discussed herein.

After a client 102 receives a first file comprising sequences of data (step 705), the client 102 may display said first file (step 707). The file may be displayed in any manner appropriate for the given file. In some embodiments, the file may be displayed in a web browser. In other embodiments, the file may be displayed in a business application, such as a word processor or a spreadsheet. In still other embodiments the file may comprise a standalone application and be displayed as such. In some embodiments, the file may correspond to an application running in a virtual computing environment. In one embodiment, the file may correspond to a remotely executing application. In another embodiment, the file may correspond to a streaming application.

After a client 102 displays said first file (step 707), the client 102 or client agent 120 may store said first file (step 708). The client 102 may store the first file in any storage element, including storing in a cache, disk, flash memory, or RAM. In some embodiments, the client 102 may compress the file for storage. In other embodiments the client 102 may store only portions of the file. In some embodiments the client 102 may store said first file (step 708) before or during the display of said first file (step 707).

After a client 102 stores said first file (step 708), the client 102 or client agent 120 may receive a third file (step 723). In the embodiment shown, the client 102 receives the third file from a network appliance 200. In other embodiments, the client 102 may receive the third file from any computing device. Said file may comprise any file type or protocol discussed herein. In some embodiments, the file may comprise ASCII characters. In other embodiments, the file may comprise binary data.

After a client 102 receives said third file (step 723), the client or client agent 120 may execute a Javascript or other function to assemble a second file (step 725). In some embodiments, the Javascript function may be included in said third file. In other embodiments, the Javascript function may be already stored on the client 102. In some embodiments, the Javascript function may be provided in a client-side acceleration program. In some embodiments, the third file may comprise a link to a location where the client 102 may download the Javascript function.

The Javascript function may perform any technique, or the reverse of any technique described herein to assemble said second file. In some embodiments, the Javascript function may comprise the assembly function received in step 903. In other embodiments, the Javascript function may comprise a reference to said assembly function. In still other embodiments, said Javascript function may comprise means for downloading said assembly function.

After executing a Javascript function to assemble said second file (step 725), the client may display said second file (step 727). The file may be displayed in accordance with any of the methods described herein for displaying a file.

Figure 10:
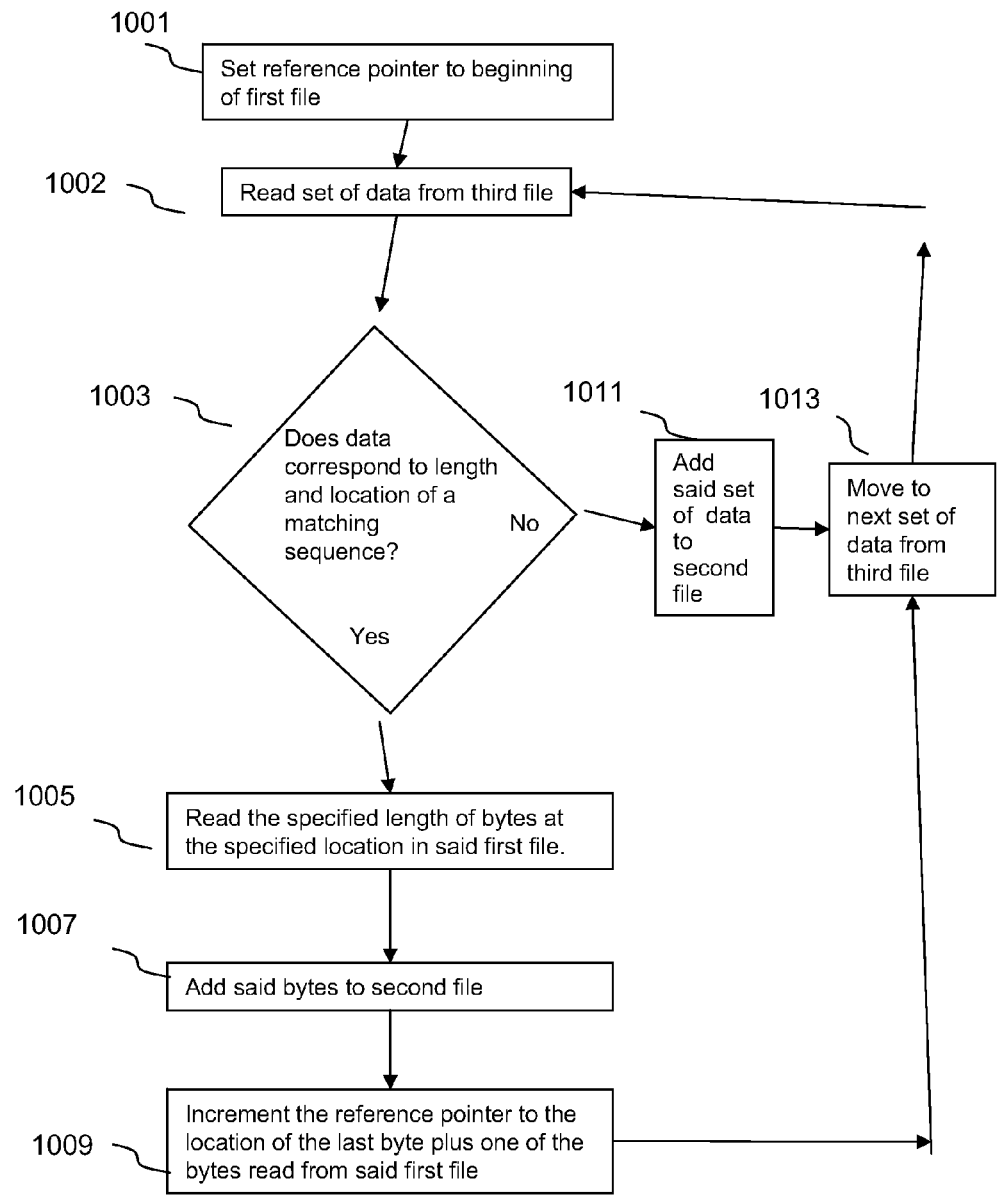
FIG. 10 is a flow diagram depicting one embodiment of a method for assembling a second file from a previously stored first file and a third file comprising sequences of data from the second file and representations of locations and lengths of sequences of data present in both the first and second files.

Referring now to FIG. 10, one embodiment of a method for assembling a second file from a previously stored first file and a third file comprising sequences of data from the second file and representations of locations and lengths of sequences of data present in both a first and second files is shown. In brief overview, the method comprises reading a set of data from a third file (step 601) and determining whether said set of data corresponds to a locations and length of said sequences of data present in both the first and second files (step 603). The method then may comprise reading the specified length of bytes at the specified location in said first file (step 605); adding said bytes to the second file (step 607); incrementing the reference pointer to the location of the last byte plus one of the bytes read from the first file (step 609); and moving to the next set of data from said third file (step 613). In one embodiment, said method may be performed by a client 102 or client agent 120. In another embodiment, said method may be performed by a assembly function as described in FIG. 9.

Still referring to FIG. 10, now in greater detail, a client 102 may set a reference pointer to the beginning of the first file. This may be performed in accordance with any of the methods described herein.

After setting the reference pointer (step 601) a client 102 may read a set of data from a third file (step 602). Said set of data may comprise any number of bits or bytes of said third file. In one embodiment, said set of data is then stored in a memory element or cache.

After reading said set of data (step 602), a client 102 may determine whether said set of data corresponds to a length and location of a sequence in the first file. In one embodiment, a client may determine whether said set of data comprises a special character or bit sequence.

If said set of data does not correspond to a length and location of a sequence in the first file, the client 102 may add said set of data to the second file (step 611). Said addition may comprise appending said set of data to the end of the second file. The client 102 may then move to the next set of data from the third file (step 613).

If said data does correspond to a length and location of a sequence in the first file, the client 102 may then read the specified length of bytes at the specified location in the first file (step 605). The client may determine the length and location specified by recognizing any of the representations of lengths and locations described herein. In one embodiment, the client may then store said specified bytes in a memory element or cache.

After reading the specified length of bytes at the specified location in the first file (step 605), the client 102 may then add said bytes to the second file (step 607). Said addition may comprise appending said bytes to the end of the second file.

The client 102 may then increment the reference pointer to the location of the last byte plus one of the bytes read from said first file (step 609). This may be performed in accordance with any of the methods described herein. The client 102 may then move to the next set of data from said third file. (step 613).

Figure 11:
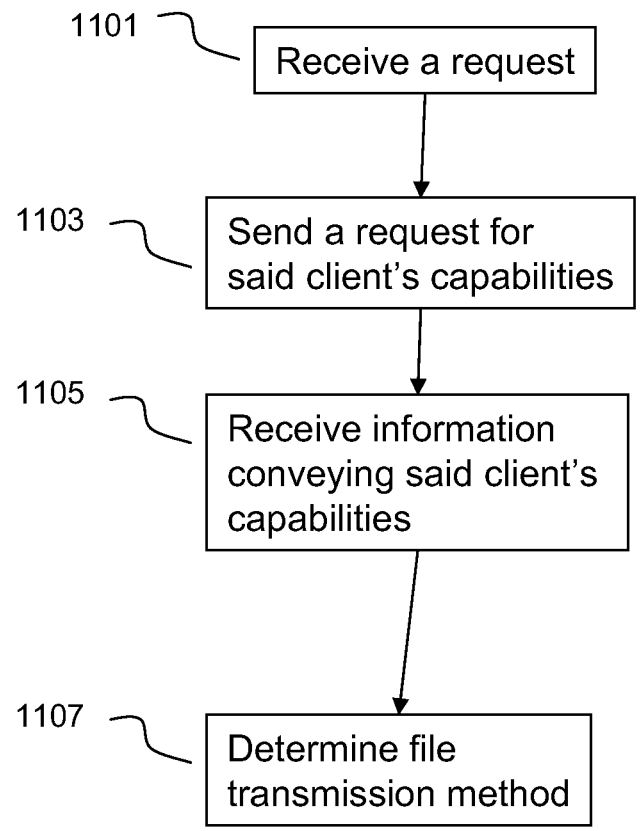
FIG. 11 is a flow diagram depicting one embodiment of a method for determining a file transmission method.

Referring now to FIG. 11, one embodiment of a method for determining a file transmission method is shown. Said method may be performed by any of the machines or combinations of machines described above, although the embodiment below describes the method being performed by a network appliance 200. In brief overview, the method comprises receiving a request from a client 102 or client agent 120 for a resource (step 1101); sending a request for said client's capabilities (step 1103); receiving information conveying said client's capabilities (step 1105); and determining a file transmission method (step (1107).

Still referring to FIG. 11, now in greater detail, the network appliance 200 receives a request from a client or client agent 120 (step 1101). In one embodiment receiving a request from a client (step 1101) comprises receiving a request directly from a client. In other embodiments, the request from a client 102 may be received from any of the networks, connections, and appliances previously discussed. Said request may comprise any of the protocols previously discussed. In some embodiments the request may comprise the request exactly as transmitted from the client 102. In other embodiments the request may comprise a modification of an original request from a client 102. Said modifications may comprise modifications in the course of providing any of the network appliance services discussed above, and any other modifications to the content, format, protocol, addressing, headers, or other portions of the request. request from a client 102, or a new request. A request may comprise a resource directly requested by a client 102, and it may comprise a resource requested in the course of performing any service for the client 102.

After receiving a request from a client (step 1101), the network appliance 200 sends a request for said client's capabilities (step 1103). In one embodiment, said request may be sent to the client 102. In another embodiment, request may be sent to a collection agent as described in U.S. patent application Ser. No. 10/956,832 "A METHOD AND APPARATUS FOR ASSIGNING ACCESS CONTROL LEVELS IN PROVIDING ACCESS TO NETWORKED CONTENT FILES" whose contents are expressly incorporated herein by reference. Said collection agent may reside on the same physical machine as the network appliance sending the request, or they may reside on different physical machines. Said request may also be sent to a file, a cache, a database, a server, an executing application, or any other source of information concerning the client 102.

After sending a request for the client's capabilities (step 1103) the network appliance 200 receives information conveying said clients capabilities (step 1105). Said information may be received from a client 102, or client agent 120, a collection agent, a file, a cache, a database, a server, an executing application, or any other source of information concerning the client 102. Said information may comprise, without limitation machine ID of a client node 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information, authorization credentials, and any of the other capabilities or preferences discussed above. In some embodiments, the network appliance may store or cache said information for later retrieval.

After receiving information conveying said clients capabilities (step 1105); the network appliance may determine a file transmission method corresponding to said client 102 or client agent 120 (step 1107). Said determination may be made on the basis of any of the information received.

In some embodiments, the network appliance 200 may determine, in response to information received in step 1105, to transmit files in accordance with the method for creating efficient updates to a previously stored file described in FIG. 7. In one embodiment, said determination may be made in response to information corresponding to the client's 102 memory size, connection speed, connection bandwidth, processor speed, or the prior existence of a stored file.

In some embodiments, the network appliance 200 may determine, in response to information received in step 1105, to transmit a assembly function to the client 102. For example, the network appliance may transmit a assembly function to a client 102 if the network appliance 200 receives information that the client 102 does not possess the assembly function, and the information indicates the client has the capability to execute a assembly function. In some embodiments, said assembly function may be transmitted along with any other files, including requested content files, or other files transmitted in accordance with the functions of the network appliance 200. In some embodiments, a network appliance may possess a plurality of assembly functions. For example, a network appliance 200 may possess a number of assembly functions optimized for different computing environments, operating systems, and hardware configurations. The network appliance may then determine, in response to the information received in step 1105, which assembly function to transmit to a client 102.

While the invention has been particularly shown and described with reference to specific preferred embodiments, it should be understood by those skilled in the art that various changes in form and detail may be made therein departing from the spirit and scope of the invention as defined by the appended claims.

The invention claimed is:

1. A method for using a client agent to enable HTTP cookie authentication in non-HTTP communications from a client, the method comprising:
   (a) intercepting, by a client agent executing on a client, a non-HTTP connection request to a server from an application executing on the client, the non-HTTP connection request comprising a request to establish a transport layer connection with the server;
   (b) establishing, by the client agent, a transport layer virtual private network connection between the client agent and a network appliance intermediary to the client and the server;
   (c) transmitting, from the client agent via the established transport layer virtual private network connection responsive to the interception of the non-HTTP connection request, an HTTP request comprising an authentication cookie to the network appliance to authenticate the non-HTTP connection request prior to transmitting the non-HTTP connection request of the application to the network appliance; and
   (d) transmitting, by the client agent via the transport layer virtual private network connection responsive to receiving from the network appliance an HTTP response comprising acceptance of the authentication cookie by the network appliance, the non-HTTP connection request to the server via the network appliance and any data for the non-HTTP connection queued by the client agent while waiting for receipt of the HTTP response indicating acceptance of the authentication cookie by the network appliance.

2. The method of claim 1, wherein the client agent executes transparently with respect to one of the following network layers: the application layer, the presentation layer, the session layer, or the transport layer.

3. The method of claim 1, wherein step (a) comprises intercepting, by a client agent executing on a client, a transport layer connection request from the client, wherein the interception occurs at one of the following network layers: the transport layer, the network layer, or the data layer.

4. The method of claim 1, wherein step (a) comprises intercepting, by a client agent executing on a client, a TCP SYN packet.

5. The method of claim 1, wherein step (c) comprises transmitting, by the client agent via the established connection, an HTTP request comprising an authentication cookie prior to any data being transmitted via the connection.

6. The method of claim 1, wherein step (c) comprises transmitting by the client agent, in response to the determination that the connection has been established, an HTTP request comprising an authentication cookie, the cookie comprising user authentication credentials.

7. The method of claim 1, wherein step (c) comprises transmitting, by the client agent via the established connection, an HTTP request comprising an authentication cookie, the cookie comprising application-specific authentication credentials.

8. The method of claim 1, wherein step (c) further comprises receiving, by the client agent, an HTTP response, the HTTP response comprising an acceptance of the authentication cookie.

9. A computer implemented system for using a client agent to enable HTTP cookie authentication in non-HTTP communications from a client, the system comprising:
   a client computing device; and
   a client agent executing on the client, which intercepts a non-HTTP connection request to a server from an application on the client; establishes a transport layer virtual private network connection between the client agent and a network appliance intermediary to the client and the server, the non-HTTP connection request comprising a request to establish a transport layer connection with the server;
   transmits, from the client agent via the established transport layer virtual private network connection responsive to the interception of the non-HTTP connection request, an HTTP request comprising an authentication cookie to the network appliance to authenticate the non-HTTP connection request prior to transmitting the non-HTTP connection request of the application to the network appliance; and
   transmits, by the client agent via the transport layer virtual private network connection, responsive to receiving from the network appliance an HTTP response comprising acceptance of the authentication cookie by the network appliance, the non-HTTP connection request to the server via the network appliance and any data for the non-HTTP connection queued by the client agent while waiting for receipt of the HTTP response indicating acceptance of the authentication cookie by the network appliance.

10. The system of claim 9, wherein the client agent executes transparently with respect to one of the following network layers: the application layer, the presentation layer, the session layer, or the transport layer.

11. The system of claim 9, wherein the client agent intercepts a transport-layer connection request from the client, wherein the interception occurs at one of the following network layers: the transport layer, the network layer, or the data layer.

12. The system of claim 9, wherein the client agent intercepts a TCP SYN packet.

13. The system of claim 9, wherein the client agent transmits, via the established connection, an HTTP request comprising an authentication cookie prior to any data being transmitted via the connection.

14. The system of claim 9, wherein the client agent transmits, via the established connection, an HTTP request comprising an authentication cookie, the cookie comprising user authentication credentials.

15. The system of claim 9, wherein the client agent transmits, via the established connection, an HTTP request comprising an authentication cookie, the cookie comprising application-specific authentication credentials.

16. The system of claim 9, wherein the client agent receives an HTTP response, the HTTP response comprising an acceptance of the authentication cookie.

17. A method for using a client agent to enable HTTP cookie authentication in non-HTTP communications from a client, the method comprising:
   (a) receiving, by a client agent executing on a client, an authentication cookie from a network appliance intermediary to the client and a server;
   (b) intercepting, by the client agent, a first request of an application on the client to establish a non-HTTP connection with the server, the non-HTTP connection comprising a transport layer connection with the server;
   (c) transmitting, from the client agent via an established transport layer connection between the client agent and the network appliance, responsive to the interception of the first request of the application, a HTTP request comprising the authentication cookie to authenticate the non-HTTP connection for the first request by the network appliance prior to transmitting the first request of the application via the network appliance to the server; and
   (d) transmitting, by the client agent via the established transport layer connection, responsive to receiving a HTTP response identifying acceptance of the authentication cookie by the network appliance, the first request for the non-HTTP connection to the server via the network appliance and any data for the non-HTTP connection queued by the client agent while waiting for the receipt of the HTTP response.

* * * * *

UNITED STATES PATENT AND TRADEMARK OFFICE
CERTIFICATE OF CORRECTION

| | | |
|---|---|---|
| PATENT NO. | : 8,561,155 B2 | Page 1 of 1 |
| APPLICATION NO. | : 11/462300 | |
| DATED | : October 15, 2013 | |
| INVENTOR(S) | : He et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this
Third Day of March, 2015

Michelle K. Lee
*Deputy Director of the United States Patent and Trademark Office*